(12) United States Patent
Kubota et al.

(10) Patent No.: US 12,007,479 B2
(45) Date of Patent: Jun. 11, 2024

(54) DISTANCE MEASURING DEVICE AND DISTANCE MEASURING METHOD

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hiroshi Kubota, Fussa (JP); Nobu Matsumoto, Ebina (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 840 days.

(21) Appl. No.: 17/001,735

(22) Filed: Aug. 25, 2020

(65) Prior Publication Data

US 2021/0088660 A1   Mar. 25, 2021

(30) Foreign Application Priority Data

Sep. 19, 2019   (JP) ................................ 2019-170815

(51) Int. Cl.
 *G01S 17/10*   (2020.01)
 *G01S 7/481*   (2006.01)
 *G01S 17/89*   (2020.01)

(52) U.S. Cl.
 CPC ............ *G01S 17/10* (2013.01); *G01S 7/4814* (2013.01); *G01S 7/4816* (2013.01); *G01S 7/4817* (2013.01); *G01S 17/89* (2013.01)

(58) Field of Classification Search
 CPC ...... G01S 17/10; G01S 7/4814; G01S 7/4816; G01S 7/4817; G01S 17/89
 See application file for complete search history.

(56) References Cited

U.S. PATENT DOCUMENTS 7,880,643 B2 * 2/2011 Brega ..................... G08G 1/017
                                                                                                340/936
10,078,132 B2 * 9/2018 Ishikawa ............... G01S 7/4817
(Continued)

FOREIGN PATENT DOCUMENTS

JP   2011-089874 A   5/2011
JP   2012-058124 A   3/2012
(Continued)

OTHER PUBLICATIONS

Carter, Jamie et al., "Lidar 101: An Introduction to Lidar Technology, Data, and Applications", Nov. 2012, NOAA Coastal Services Center (Year: 2012).*

(Continued)

*Primary Examiner* — Yuqing Xiao
*Assistant Examiner* — Benjamin Richard Hebert
(74) *Attorney, Agent, or Firm* — Oblon, McClelland, Maier & Neustadt, L.L.P.

(57) ABSTRACT

A distance measuring device according to this embodiment includes a plurality of sensors, a switching circuit, and a distance measurement circuit. The plurality of sensors that convert reflected light of laser light received via a light-receiving optical system into an electric signal. The plurality of sensors respectively have different light receiving positions with respect to the light-receiving optical system. The switching circuit switches and outputs an output signal output from a first sensor used for measurement and an output signal output from a second sensor used for measurement after the measurement by the first sensor among the plurality of sensors. The distance measurement circuit measures the distance to a measurement target object on the basis of a time difference between light emission timing of the laser light and timing of a peak position of a time-series (Continued)

luminance signal based on the output signal of the switching circuit.

16 Claims, 28 Drawing Sheets

(56) References Cited

U.S. PATENT DOCUMENTS

| | | | |
|---|---|---|---|
| 2012/0062867 A1 | 3/2012 | Shibatani | |
| 2016/0047903 A1* | 2/2016 | Dussan | G01S 17/42 |
| | | | 356/5.01 |
| 2017/0363740 A1 | 12/2017 | Kubota et al. | |
| 2017/0371348 A1* | 12/2017 | Mou | G06V 20/56 |
| 2018/0113200 A1* | 4/2018 | Steinberg | G01S 17/931 |
| 2018/0341019 A1* | 11/2018 | Sakai | G01S 7/003 |
| 2019/0086522 A1 | 3/2019 | Kubota et al. | |
| 2019/0170866 A1* | 6/2019 | Iguchi | G01S 7/499 |
| 2020/0033450 A1* | 1/2020 | Zhang | G01S 7/4815 |
| 2020/0292677 A1 | 9/2020 | Kubota et al. | |
| 2021/0293931 A1* | 9/2021 | Nemet | G01S 7/4813 |

FOREIGN PATENT DOCUMENTS

| | | |
|---|---|---|
| JP | 2016-090268 A | 5/2016 |
| JP | 2019-2760 A | 1/2019 |
| JP | 2019-052981 A | 4/2019 |
| JP | 2020-148670 A | 9/2020 |

OTHER PUBLICATIONS

U.S. Appl. No. 16/567,707, filed Sep. 11, 2019, Kubota et al.

\* cited by examiner

FIG.10B

TURNAROUND

Line #0

Line #1

DATA STORAGE EXAMPLE 1

| 1(CH1) | 2(CH1) | 3(CH1) |
|--------|--------|--------|
| 1(CH2) | 2(CH2) | 3(CH2) |
| 4(CH1) | 5(CH1) | 6(CH1) |
| 4(CH2) | 5(CH2) | 6(CH2) |
| 7(CH1) | 8(CH1) | 9(CH1) |
| 7(CH2) | 8(CH2) | 9(CH2) |
| D.C.   | D.C.   | D.C.   |
| D.C.   | D.C.   | D.C.   |

DATA STORAGE EXAMPLE 2

| 1(CH1) | 2(CH1) | 3(CH1) |
|--------|--------|--------|
| 1(CH2) | 2(CH2) | 3(CH2) |
| 6(CH2) | 5(CH2) | 4(CH2) |
| 6(CH1) | 5(CH1) | 4(CH1) |
| 7(CH1) | 8(CH1) | 9(CH1) |
| 7(CH2) | 8(CH2) | 9(CH2) |
| D.C.   | D.C.   | D.C.   |
| D.C.   | D.C.   | D.C.   |

FIG.18

# DISTANCE MEASURING DEVICE AND DISTANCE MEASURING METHOD

CROSS-REFERENCE TO RELATED APPLICATIONS

This application is based upon and claims the benefit of priority from the prior Japanese Patent Application No. 2019-170815, filed on Sep. 19, 2019 the entire contents of which are incorporated herein by reference.

FIELD

Embodiments of the present invention relate to a distance measuring device and a distance measuring method.

BACKGROUND

There is known a distance measuring device called LIDAR (Light Detection and Ranging, Laser Imaging Detection and Ranging). The distance measuring device irradiates laser light on a measurement target object and converts the intensity of reflected light reflected by the measurement target into a time-series luminance signal on the basis of an output of a sensor. Consequently, the distance to the measurement target is measured on the basis of a time difference between a point in time of emission of the laser light and a point in time corresponding to a peak of the time-series luminance signal value.

In this distance measuring device, it is attempted to expand an irradiation range of the laser light in the vertical direction. However, there is a risk that, if the irradiation range is expanded, a light reception range of a sensor may also expand and noise of the time-series luminance signal may increase. As explained in detail below, in particular, this problem is conspicuous when the irradiation of the laser light is one-dimensionally quickly scanned.

BRIEF DESCRIPTION OF THE DRAWINGS

FIG. 10B depicts a diagram showing an example of 3×5 weighted integration in the skipping:
FIG. 18 depicts a diagram showing data storage examples 1 and 2 concerning distance images.

DETAILED DESCRIPTION

Figure 1:
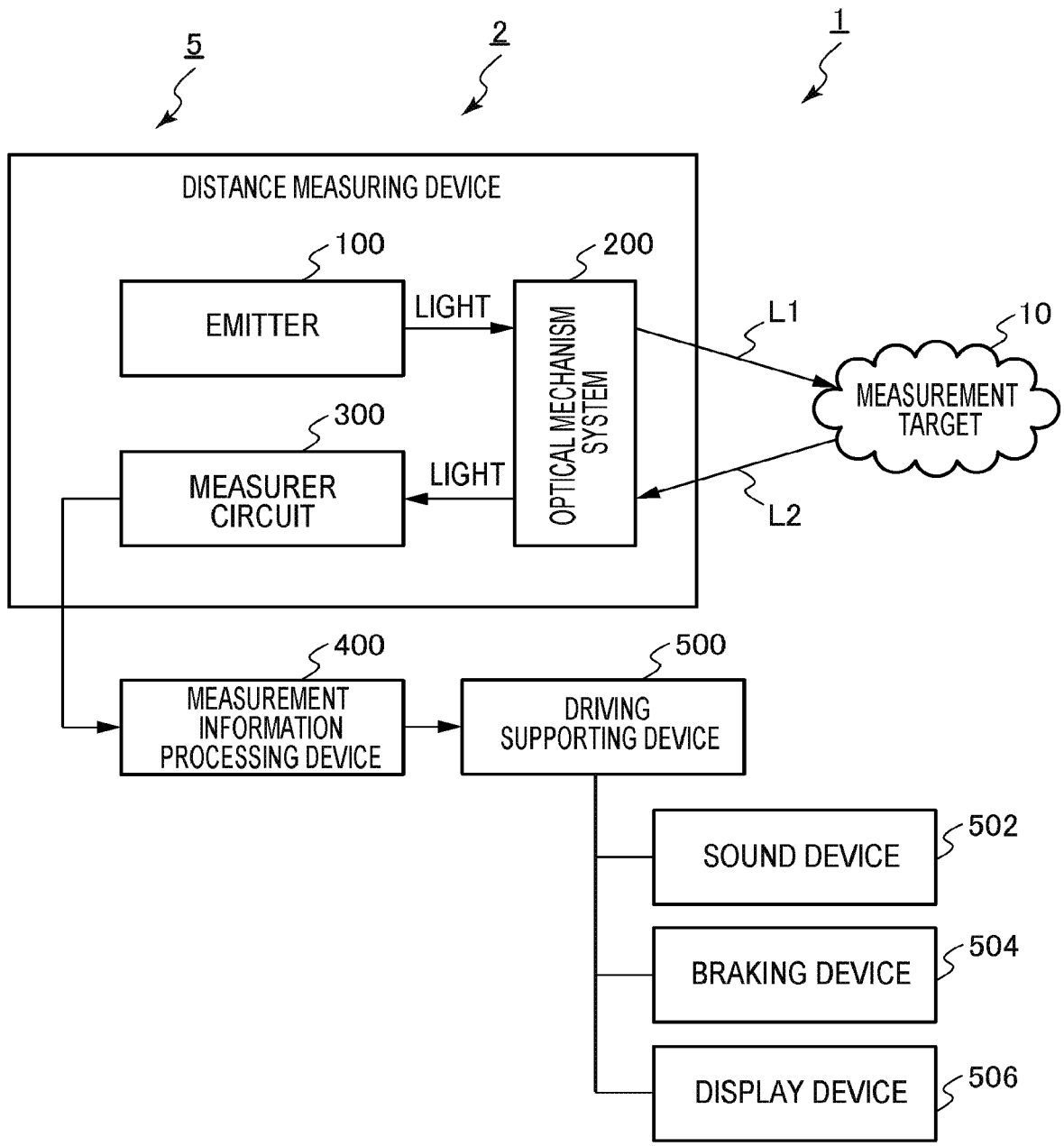
FIG. 1 depicts a diagram showing a schematic overall configuration of a driving supporting system according to an embodiment.

A distance measuring device according to this embodiment includes a plurality of sensors, a switching circuit, and a distance measurement circuit. The plurality of sensors are a plurality of sensors that convert reflected light of laser light received via a light-receiving optical system into an electric signal. The plurality of sensors respectively have different light receiving positions with respect to the light-receiving optical system. The switching circuit switches and outputs an output signal output from a first sensor used for measurement among the plurality of sensors and an output signal output from a second sensor used for measurement after the measurement by the first sensor among the plurality of sensors. The distance measurement circuit measures the distance to a measurement target object on the basis of a time difference between light emission timing of the laser light and timing of a peak position of a time-series luminance signal based on the output signal of the switching circuit.

A distance measurement device and a distance measuring method according to an embodiment of the present invention are explained in detail below with reference to the drawings. Note that the embodiment explained below is an example of an embodiment of the present invention. The present invention is not interpreted to be limited to the embodiment. In the drawings referred to in the embodiment, the same parts and parts having the same functions are denoted by the same or similar reference numerals and signs. Repeated explanation of the parts is sometimes omitted. Dimension ratios of the drawings are sometimes different from actual ratios for convenience of explanation. A part of components is sometimes omitted from the drawings.

Embodiment

A distance measuring device according to an embodiment is a distance measuring device that switches and outputs output signals output from a plurality of sensors respectively having different light receiving positions with respect to a light-receiving optical system to thereby expand an irradiation range of laser light in the vertical direction and suppress noise of a time-series luminance signal. The distance measuring device is explained below more in detail.

First Embodiment

FIG. 1 is a diagram showing a schematic overall configuration of a driving supporting system 1 according to an embodiment. As shown in FIG. 1, the driving supporting system 1 performs driving support based on a distance image. The driving supporting system 1 includes a distance measuring system 2, driving supporting device 500, a sound device 502, a braking device 504, and a display device 506. The distance measuring system 2 generates a distance image of a measurement target object 10 and includes a distance measuring device 5 and a measurement information processing device 400.

The distance measuring device 5 measures a distance to the measurement target object 10 using a scanning scheme or a TOF (Time Of Flight) scheme. More specifically, the distance measuring device 5 includes an emitter 100, an optical mechanism system 200, and a measurement circuit 300.

The emitter 100 intermittently emits laser light L1. The optical mechanism system 200 irradiates the laser light L1 emitted by the emitter 100 on the measurement target object 10 and makes reflected light L2 of the laser light L1 reflected on the measurement target object 10 incident on the measurement circuit 300. The laser light means light having a phase and a frequency almost aligned. The reflected light L2 means light in a predetermined direction among scattered lights by the laser light L1.

The measurement circuit 300 measures the distance to the measurement target object 10 on the basis of the reflected light L2 received via the optical mechanism system 200. That is, the measurement circuit 300 measures the distance to the measurement target object 10 on the basis of a time difference between a point in time when the emitter 100 irradiates the laser light L1 on the measurement target object 10 and a point in time when the reflected light L2 is measured.

The measurement information processing device 400 performs noise reduction processing and outputs distance image data on the basis of distances to a plurality of measurement points on the measurement target object 10. A part or all of the measurement information processing device 400 may be incorporated in a housing of the distance measuring device 5.

The driving supporting device 500 supports driving of a vehicle according to an output signal of the measurement information processing device 400. The sound device 502, the braking device 504, the display device 506, and the like are connected to the driving supporting device 500.

The sound device 502 is, for example, a speaker and is dispose in a position audible from a driver's seat in the vehicle. The driving supporting device 500 causes, on the basis of an output signal of the measurement information processing device 400, for example, the sound device 502 to generate sound such as "five meter to a target object". Consequently, for example, even when attention of the driver decreases, it is possible to cause the driver to hear the sound to call the attention of the driver.

The braking device 504 is, for example, an auxiliary brake. The driving supporting device 500 causes, on the basis of an output signal of the measurement information processing device 400, the braking device 504 to brake the vehicle, for example, when the target object approaches a predetermined distance, for example, 3 meters to the vehicle.

The display device 506 is, for example, a liquid crystal monitor. The driving supporting device 500 displays an image on the display device 506 on the basis of an output signal of the measurement information processing device 400. Consequently, for example, even at the time of backlight, it is possible to accurately grasp external information by referring to the image displayed on the display device 506.

Figure 2:
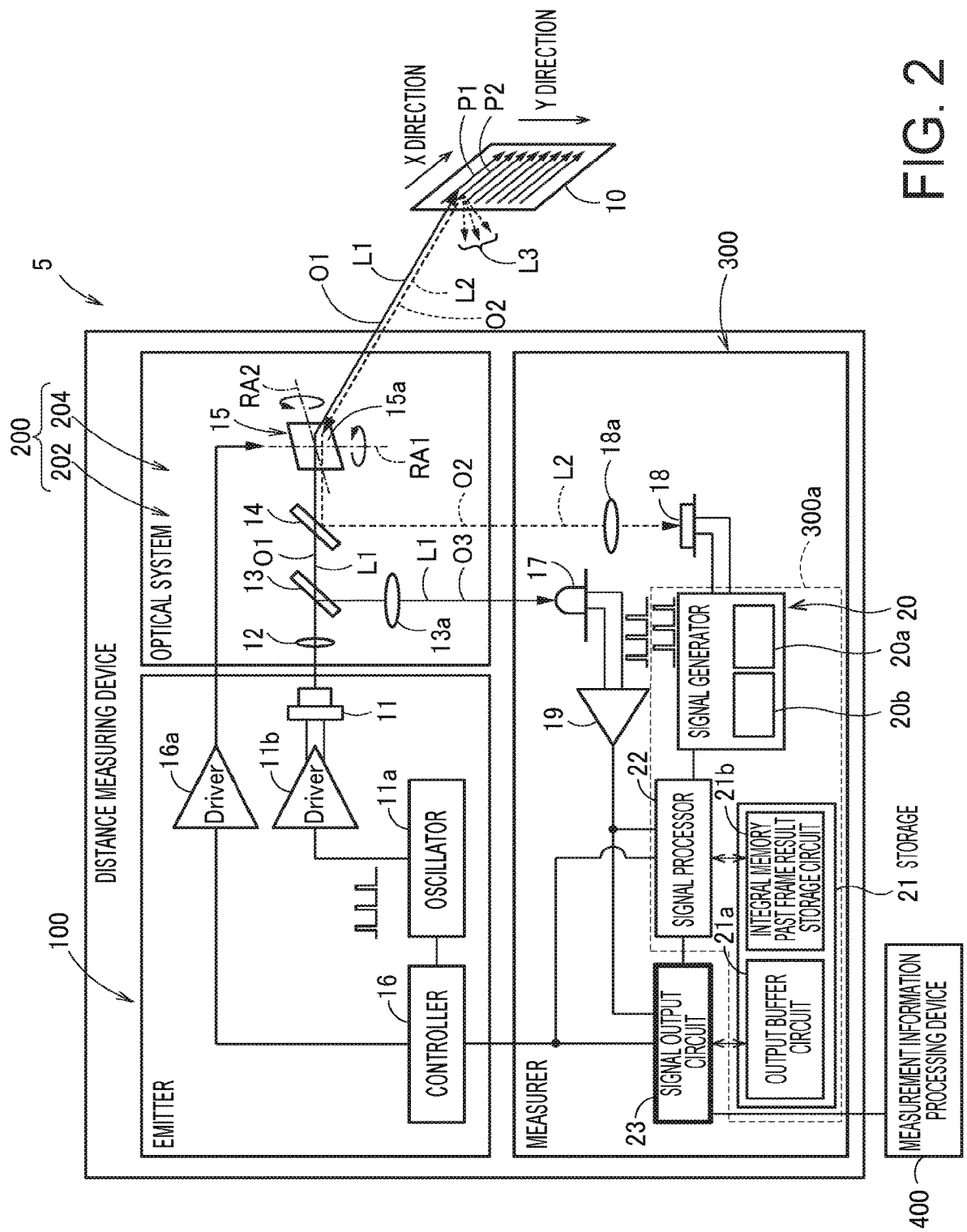
FIG. 2 depicts a diagram showing a configuration example of a distance measuring device according to a first embodiment.

More detailed configuration examples of the emitter 100, the mechanism optical mechanism system 200, and the measurement circuit 300 of the distance measuring device 5 according to the embodiment are explained with reference to FIG. 2. FIG. 2 is a diagram showing a configuration example of the distance measuring device 5 according to the first embodiment. As shown in FIG. 2, the distance measuring device 5 includes the emitter 100, the optical mechanism system 200, the measurement circuit 300, and the measurement information processing device 400. Among scattered lights L3, scattered light in a predetermined direction is referred to as reflected light L2.

The emitter 100 includes a light source 11, an oscillator 11a, a first driving circuit 11b, a control circuit 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 incudes a second optical element 14 and the mirror 15. That is, the irradiation optical system 202 and the light-receiving optical system 204 share the mirror 15.

The measurement circuit 300 includes a photodetector 17, a sensor 18, a lens 18a, a first amplifier 19, and a signal output circuit (an output interface) 23, and the distance measurement circuit 300a. Note that, as an existing method for scanning light, the mirror 15 is used. However, there is a method of rotating the distance measuring device 5 (hereinafter referred to as rotating method) besides using the mirror 15. As another existing method for scanning light, there is an OPA method (Optical Phased Array). This embodiment does not rely on a method of scanning light. Therefore, light may be scanned by the rotating method or the OPA method. The signal processing circuit 22 according to this embodiment corresponds to a speed measuring device. The lens 18a may be included in the light-receiving optical system 204.

The oscillator 11a of the emitter 100 generates a pulse signal on the basis of control by the control circuit 16. The first driving circuit 11b drives the light source 11 on the basis of the pulse signal generated by the oscillator 11a. The light source 11 is a laser light source such as a laser diode (LD) and is configured by, for example, four laser diodes. Irradiation on a mirror by a plurality of laser diodes is described in, for example, C. Niclass, et al., "Design and characterization of a 256×64-pixel single-photon imager in CMOS for a MEMS-based laser scanning time-of-flight sensor", Optics Express, pp. 11863-11881, 2012 (Cited Document 1). The number of laser diodes is not limited to four. Irradiating positions of the four laser diodes are, for example, different in the vertical direction with respect to an optical axis L1. The four laser diodes intermittently emit laser light L1 according to driving by the first driving circuit 11b. Note that the four laser diodes of the light source 11 according to this embodiment are controlled to emit lights in order. However, the light source 11 is not limited to this. For example, two laser diodes not adjacent to each other may simultaneously irradiate lights. The number of laser diodes is not limited to four. The light source 11 may be configured by one laser diode. Further, the mirror of the Cited Document 1 is a MEMS mirror, which is an example in which the mirror is driven relatively quickly at 1.3 kHz in one direction. A polygon mirror including a plurality of mirror surfaces having different inclination angles may be used as the mirror 15 to change the irradiation range in the vertical direction. Alternatively, the light source 11 may be configured by one laser diode, an optical axis RA2 of the mirror 15 may be changed, and the irradiation range may be changed in the vertical direction.

The light source 11, the lens 12, the first optical element 13, the second optical element 14, and the mirror 15 are disposed in this order on an optical axis O1 of the irradiation optical system 202. Consequently, the lens 12 collimates the intermittently emitted laser light L1 and guides the laser light L1 to the first optical element 13.

The first optical element 13 transmits the laser light L1 and makes a part of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror or a perforated mirror.

The mirror 15 includes a reflection surface 15a that reflects the laser light L1 intermittently emitted from the light source 11. A device of the mirror 15 according to the first embodiment is configured by, for example, a MEMS (Micro Electro Mechanical). The reflection surface 15a is capable of vibrating around, for example, two vibration axes RA1 and RA2 crossing each other. Consequently, the mirror 15 periodically changes (scans) an irradiation direction of the laser light L1. When the mirror 15 is configured by the MEMS, the mirror 15 performs a reciprocating motion at a predetermined period with respect to the two vibration axes RA1 and RA2 with, for example, resonance.

Note that the mirror 15 is not limited to the MEMS. As explained above, the irradiation range may be changed in the vertical direction using, for example, a polygon mirror having different inclination angles. Alternatively, a general rotary mirror may be used. Therefore, in this embodiment, the vibration axes RA1 and RA2 are sometimes referred to as rotation axes. In this embodiment, vibration of the mirror 15 with respect to the vibration axes RA1 and RA2 is sometimes referred to as rotation with respect to the vibration axes RA1 and RA2. For example, a deflection angle of the mirror 15 with respect to the vibration axes RA1 and RA2 is sometimes referred to as rotation angle. Further, the laser light L1 can also be scanned by rotating a part of an emission section and a light receiving section without using the mirror 15. In that case, the second optical element 14 is unnecessary.

The control circuit 16 includes, for example, a CPU (Central Processing Unit). The control circuit 16 performs, on the second driving circuit 16a, control for continuously changing an inclination angle of the reflection surface 15a. The second driving circuit 16a drives the mirror 15 according to a control signal supplied from the control circuit 16. That is, the control circuit 16 controls the second driving circuit 16a to change the irradiation direction of the laser light L1. Changing an irradiation direction or the like of light is called scanning.

On an optical axis O2 of the light-receiving optical system 204, the reflection surface 15a of the mirror 15, the second optical element 14, the lens 18a, and the sensor 18 are disposed in the order of incidence of the reflected light L2. The optical axis O1 is a focal axis of the lens 12 passing the center position of the lens 12. The optical axis O2 is a focal axis of the lens 18a passing the center position of the lens 18a.

The reflection surface 15a makes the reflected light L2 traveling along the optical axis O2 among the scattered lights L3 scattered on the measurement target object 10 incident on the second optical element 14. The second optical element 14 changes a traveling direction of the reflected light L2 reflected on the reflection surface 15a and makes the reflected light L2 incident on the lens 18a of the measurement circuit 300 along the optical axis O2. The lens 18a condenses, on the sensor 18, the reflected light L2 made incident along the optical axis O2. Note that a cylindrical lens may be used as the lens 18a. Note that, as a method of separating the optical axis O2 from the optical axis O1 and making the reflected light L2 incident on the lens 18a, it is also possible to use a method (a separation optical system) of, without using the second optical element 14, increasing the mirror reflection surface 15a in size, separating the optical axis O1 and the optical axis O2, and making the reflected light L2 directly incident on the lens 18a from the mirror reflection surface 15a.

On the other hand, a traveling direction of light reflected in a direction different from the direction of the laser light L1 among the scattered lights L3 deviates from the optical axis O2 of the light-receiving optical system 204. Therefore, even if the light reflected in the direction different from the direction of the optical axis O2 among the scattered lights L3 is made incident in the light-receiving optical system 204, the light is made incident on a position deviating from an incident surface of the sensor 18. On the other hand, among environment lights such as sunlight scattered by some object, there are lights traveling along the optical axis O2. These lights are made incident on the incident surface of the sensor 18 at random and become random noise.

In FIG. 2, for clarification, optical paths of the laser light L1 and the reflected light L2 are divided and shown. However, actually, the optical paths overlap excluding the separation optical system. An optical path in the center of a light beam of the laser light L1 is shown as the optical axis O1. Similarly, an optical path in the center of a light beam of the reflected light L2 is shown as the optical axis O2.

The sensor 18 is configured by, for example, a plurality of linear sensors respectively having difference light receiving positions with respect to the light-receiving optical system 204. Note that details of the sensor 18 are explained below.

The distance measurement circuit 300a measures the distance to the measurement target object 10 on the basis of a time-series luminance signal obtained by analog-digital converting a measurement signal obtained by converting the reflected light L2 of the laser light L1 into a signal. A detailed configuration example of the distance measurement circuit 300a including the signal generation circuit 20, the storage circuit 21, the signal processing circuit 22, and the output interface 23 is explained below.

The signal generation circuit 20 converts an electric signal output by the sensor 18 into a time-series luminance signal at a predetermined sampling interval. The signal generation circuit 20 includes an amplifier 20a and an AD converter 20b. The amplifier 20a amplifies, for example, an electric signal based on the reflected light L2. More specifically, as the amplifier 20a, for example, a transimpedance amplifier (TIA) that converts a current signal of the sensor 18 into a voltage signal and amplifies the voltage signal is used.

The AD converter 20b (ADC: Analog to Digital Converter) samples, at a plurality of sampling timings, the electric signal amplified by the amplifier 20a and converts the electric signal into a first time-series luminance signal corresponding to an irradiation direction of the laser light L1. That is, the AD converter 20b samples an electric signal amplified by the amplifier 20a. In this way, a signal obtained by sampling the electric signal based on the reflected light L2 at the predetermined sampling interval is referred to as time-series luminance signal. That is, the time-series luminance signal is a series of values obtained by sampling a temporal change of the reflected light L2 at the predetermined sampling interval. Note that the AD converter 20b is used in this embodiment. However, the present invention is not limited to this. For example, a time to digital converter (TDC) or the like may be used instead of the AD converter 20b.

The storage circuit 21 is realized by, for example, a register in a logic circuit, an SRAM, a DRAM (Dynamic Random Access Memory), a semiconductor memory element such as a flash memory, a hard disk, or an optical disk.

The storage circuit 21 includes an output buffer circuit 21a and an integral memory past frame result storage circuit 21b. The output buffer circuit 21a is a buffer of the signal output circuit 23. The integral memory past frame result storage circuit 21b stores a processing result of the signal processing circuit 22. The integral memory past frame result storage circuit 21b stores, for example, a distance measurement result (including luminance and a reliability degree).

The signal processing circuit 22 is configured by, for example, a logic circuit including an MPU (Micro Processing Unit). The signal processing circuit 22 measures a distance on the basis of a time difference between timing when the photodetector 17 detects the laser light L1 and timing when the sensor 18 detects the reflected light L2. The output interface 23 is connected to the components in the distance measurement circuit 300a and outputs a signal to an external device such as the measurement information processing device 400.

Figure 3A:
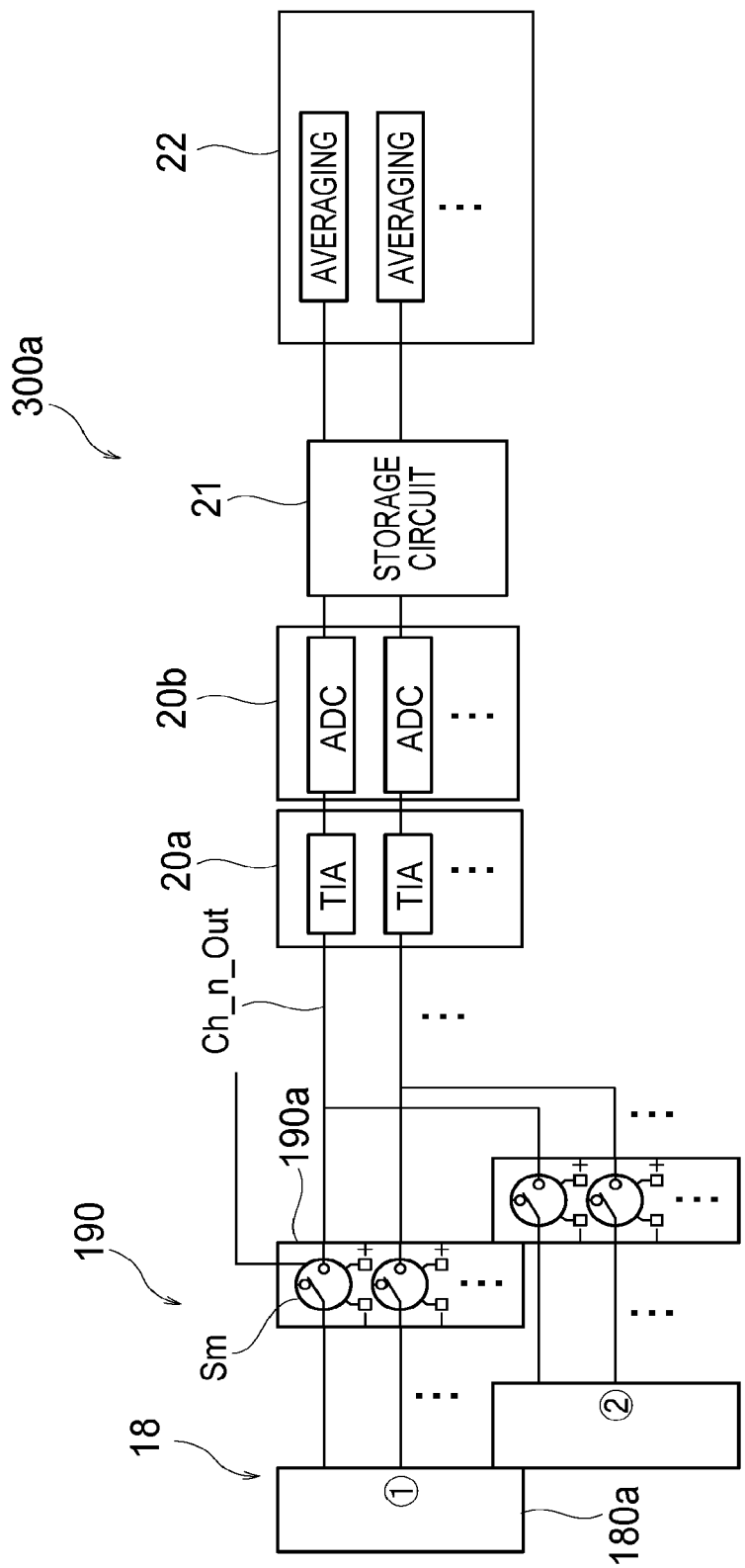
FIG. 3A depicts a block diagram showing a detailed configuration example of a sensor and distance measurement.

A detailed configuration example of the sensor 18 and the distance measurement circuit 300a is explained with reference to FIG. 3A. FIG. 3A is a block diagram showing the detailed configuration example of the sensor 18 and the distance measurement circuit 300a.

The sensor 18 is configured by, for example, four linear sensors 180a. In FIG. 3A, to simplify explanation, only two linear sensors 180a (1 in circle and 2 in circle) are shown. The linear sensor 180a is a photomultiplier (SiPM: Silicon Photomultiplier) in which, for example, thirty-two pixels are one-dimensionally arrayed. That is, pixels for thirty-two channels (CHs) are disposed in the linear sensor 180a. Note that, as angular resolution of the laser light L1, 0.1° or less is often requested as a field of view (FOV) angle in the vertical direction. 10° or more is often requested as a field of view in the vertical direction. This means that one hundred or more sensor pixels in the vertical direction are necessary in order to satisfy vertical resolution.

The sensor 18 includes a switching circuit 190. The switching circuit 190 switches output signals from the plurality of sensors according to the control by the control circuit 16 and outputs the output signals to the distance measurement circuit 300a. The switching circuit 190 is configured by, for example, a plurality of switches 190a and provided to correspond to the respective linear sensors 180a. Note that the switches 190a may be provided in the linear sensors 180a or may be provided outside the linear sensors 180a.

Each of the switches 190a further include switches Sm ($1 \leq m \leq j$), corresponding to pixels included in each of the linear sensors 180a: j is, for example, thirty-two. That is, the switch 190a can output outputs of the pixels to the distance measurement circuit 300a and interrupt the outputs. When an "H" level control signal is input to the switches Sm ($1 \leq m \leq j$), the switches Sm ($1 \leq m \leq j$) output signals of pixels n to output nodes Ch_n_Out ($1 \leq n \leq j$). On the other hand, when an "L" level control signal is input to the switches Sm ($1 \leq m \leq j$), the switches Sm ($1 \leq m \leq j$) do not output the output signals of the pixels n to the output nodes Ch_n_Out ($1 \leq n \leq j$). That is, the switching circuit 190 switches the "H" level control signal and the "L" level control signal for each of the switches 190a to thereby switch connection and interruption according to the linear sensor 180a in use.

In this way, in this embodiment, the switching circuit 190 switches connection and interruption according to the linear sensor 180a in use. For example, when the linear sensor 180a indicated by 1 in circle is used, the switching circuit 190 connects the switch 190a corresponding to the linear sensor 180a indicated by 1 in circle. The switching circuit 190 interrupts the switches 190a corresponding to the linear sensors 180a indicated by other 2 in circle to 4 in circle. Consequently, connection and nonconnection of the switches 190a are exclusively controlled. Note that ON/OFF of power supply to the linear sensors 180a requires a time until the linear sensors 180a stabilize. On the other hand, by providing the switching circuit 190, it is possible to output a signal and stops the output of the signal in a state in which the linear sensors 180a are driven. Consequently, the linear sensors 180a can be driven in a stable state.

Figure 3B:
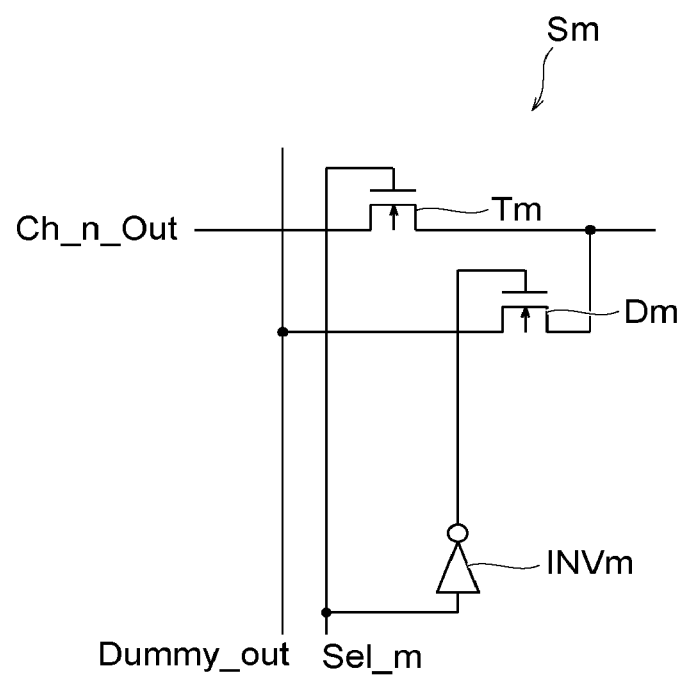
FIG. 3B depicts a diagram showing a configuration example e of a switch element configuring a switch.

FIG. 3B is a diagram showing a configuration example of the switch Sm configuring the switch 190a. Stable driving of the linear sensor 180a is explained with reference to FIG. 3B.

The switch Sm ($1 \leq m \leq j$) shown in FIG. 3A can be realized by a configuration including a switch element Dm ($1 \leq m \leq j$) in addition to a switch element Tm ($1 \leq m \leq j$): j is, for example, thirty-two. That is, j switch elements Dm are included in the switch 190a.

One ends of all the pixels n ($1 \leq n \leq j$) of the linear sensor 180a are connected in common to first ends of the respective switch elements Tm and Dm corresponding to the one ends. The switch element Dm is, for example, a MOS transistor having a p conduction type. Second ends of the respective all switch elements Dm are connected in common to an output node Dummy_out. Second ends of the respective all switch elements Tm are connected to an output node Ch_n_Out ($1 \leq n \leq j$).

An inverter INVm corresponding to a selection node Sel_m is provided in the selection node Sel_m. More specifically, the inverter INVm corresponding to the selection node Sel_m includes an input end connected to a gate of the switch element Tm connected to the selection node Sel_m and an output end connected to a gate of the switch element Dm.

By configuring the switch Sm as explained above, two switch elements Tm and Dm corresponding to each other are controlled such that one of the switch elements Tm and Dm is turned on and, at the same time, the other is turned off according to a logical level (the "H" level or the "L" level) input to the selection node Sel_m. Consequently, for example, if the selection node Sel_m is at the "H" level, an output signal of the pixel n is output to the output node Ch_n_Out. On the other hand, if the selection node Sel_m is at the "L" level, the output signal of the pixel n is output to the output node Dummy_out. That is, when an output of the linear sensor 180a is selected, an input to the selection node Sel_m is set to the "H" level. When the output of the linear sensor 180a is not selected, the input to the selection node Sel_m is set to the "L" level. Consequently, when the linear sensor 180a is not selected, even if the pixel n in the linear sensor 180a receives light, since the output signal of the pixel n is output to the output node Dummy_out, it is possible to suppress the output to the output node Ch_n_Out ($1 \leq n \leq j$) from being affected.

In this way, when the linear sensor 180a is not selected, the output of the linear sensor 180a is output to the output node Dummy_out while the operation of the linear sensor 180a is maintained. Consequently, since the linear sensor 180a operates even when the linear sensor 180a is not selected, a state of the linear sensor 180a stabilizes and the output signal of the linear sensor 180a is output to the output node Dummy_out. Therefore, the influence on the signal processing is also suppressed.

The amplifier 20a is configured by transimpedance amplifiers (TIAs) as many as the pixels included in the linear sensor 180a. Similarly, the AD converter 20b is configured by AD converters (ADCs) as many as the pixels included in the linear sensor 180a. Consequently, it is possible to convert an output signal of each of the pixels included in the linear sensor 180a into a digital signal. A storage region corresponding to the pixels included in the linear sensors 180a may be allocated to the storage circuit 21 as well.

For example, averaging processors corresponding to the number of pixels included in the linear sensor 180a are provided in the signal processing circuit 22. Consequently, it is possible to more quickly and more highly accurately perform distance calculation for each of the pixels included in the linear sensor 180a. The distance measurement circuit 300a can be reduced in size by using the distance measurement circuit 300a in common. Consequently, the distance measurement circuit 300a can be configured as a measurement IC further reduced in size. In this way, the distance measurement circuit 300a measures the distance to the measurement target object 10 (FIG. 2) on the basis of the light emission timing of the laser light L1 (FIG. 2) and the timing of the peak position of the time-series luminance signal based on the output signal of the switching circuit 190. Note that an example of averaging processing performed by the averaging processors is explained below.

The photomultiplier, which is a light receiving element (a pixel) of the linear sensor 180a, is a photon counting device obtained by integrating a plurality of single photon avalanche breakdown diodes (SPAD). The photomultiplier is capable of detecting feeble light in a photon counting level. The SPAD is configured by an avalanche photodiode (APD) in a Geiger mode and a quench resistor.

The avalanche photodiode is a light receiving element, light reception sensitivity of which is increased using a phenomenon called avalanche multiplication. The avalanche photodiode used in the Geiger mode is generally used together with a quench element (explained below) and called single photon avalanche photodiode (SPAD). The avalanche photodiode 180a made of silicon has sensitivity to, for example, light having a wavelength of 200 nm to 1000 nm.

The linear sensor 180a according to this embodiment is configured by a silicon photomultiplier but is not limited to this. For example, the linear sensor 180a may be configured by disposing a plurality of photodiodes, avalanche breakdown diodes (ABDs), photomultipliers made of a compound semiconductor, or the like.

Figure 4:
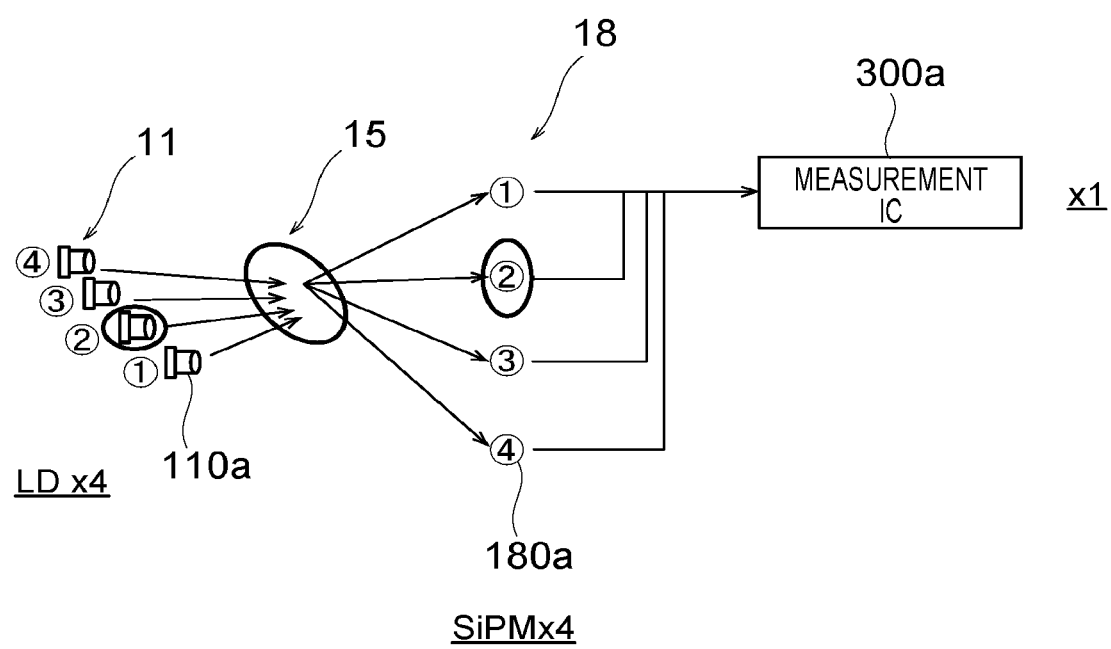
FIG. 4 depicts a schematic diagram showing a correspondence relation between a plurality of laser diodes and a plurality of linear sensors.

A correspondence relation example between the plurality of laser diodes 110a and the plurality of linear sensors 180a is explained with reference to FIG. 4. Irradiation on a mirror by the plurality of laser didoes is described in, for example, Cited Document 1. FIG. 4 is a schematic diagram showing the correspondence relation between the plurality of laser diodes 110a and the plurality of linear sensors 180a. In the following explanation, the correspondence relation is sometimes indicated by numerical values such as 1 in circle to 4 in circle in the drawings. For example, 1 in circle and 1 in circle in the drawings are in the correspondence relation. 2 in circle and 2 in circle in the drawings are in the correspondence relation. That is, 1 in circle to 4 in circle schematically indicate the laser diodes 110a and the linear sensors 180a that are in the correspondence relation. For example, when the laser diode 110a indicated by 2 in circle emits light, the light is irradiated on the measurement target object 10 via the irradiation optical system 202 (FIG. 2) including the mirror 15. Reflected light from the measurement target object 10 is received by the linear sensor 180a indicated by 2 in circle via the light-receiving optical system 204 (FIG. 2) including the mirror 15. In other words, the laser diode 110a indicated by 2 in circle and the linear sensor 180a indicated by 2 in circle correspond to each other via the irradiation optical system 202 and the light-receiving optical system 204 (FIG. 2). Similarly, for example, when the laser diode 110a indicated by 1 in circle emits light, reflected light from the measurement target object 10 (FIG. 2) is received by the linear sensor 180a indicated by 1 in circle via the light-receiving optical system 204 (FIG. 2) including the mirror 15. In this way, the plurality of linear sensors 180a respectively have different light receiving positions with respect to the light-receiving optical system 204 (FIG. 2). Note that, in this embodiment, the linear sensor 180a is sometimes simply referred to as sensor 180a.

In this way, 1 in circle to 4 in circle of the laser diodes 110a and 1 in circle to 4 in circle of the linear sensors 180a correspond to each other. Therefore, for example, when the laser diode 110a indicated by 2 in circle emits light, the switching circuit 190 outputs an output signal of the linear sensor 180a indicated by 2 in circle to the distance measurement circuit (the measurement IC) 300a. Similarly, when the laser diode 110a indicated by 1 in circle emits light, the switching circuit 190 outputs an output signal of the linear sensor 180a indicated by 1 in circle to the distance measurement circuit 300a. As it is seen from this, since the switching circuit 190 switches, according to the light emission of the laser diode 110a, an output signal to the linear sensor 180a corresponding to the laser diode 110a, output signals from the other linear sensors 180a, signals of which are interrupted, are not output to the distance measurement circuit 300a. Consequently, noise due to scattered lights by the other laser diodes 110a (when 2 in circle is emitting light, 1 in circle, 3 in circle, and 4 in circle) can be interrupted.

In this way, the switching circuit 190 switches the output signal according to irradiation timings of a plurality of light sources (the laser diodes 110a indicated by 1 in circle to 4 in circle) that respectively irradiate the laser lights L1 in different directions. The mirror 15 (FIGS. 2 and 4) vibrates in a forward direction and vibrates in a backward direction at a predetermined period with respect to the vibration axis RA1. In such a case, the switching circuit 190 may switch the output signal, for example, according to the predetermined period. On the other hand, when a polygon mirror is used as the mirror 15, the switching circuit 190 may switch the output signal according to switching timings of mirror surfaces of a polygon mirror that respectively irradiate the laser lights L1 (FIG. 2) in different directions. Note that, in this embodiment, the vibration in the forward direction is referred to as forward direction vibration and the vibration in the backward direction is referred to as backward direction vibration. As explained above, the vibration in the forward direction with respect to the vibration axes RA1 and RA2 is sometimes referred to as forward rotation and the vibration in the backward direction with respect to the vibration axes RA1 and RA2 is sometime referred to as backward rotation.

On the other hand, for example, when the laser diodes 110a indicated by 1 in circle to 4 in circle are caused to simultaneously emit lights and parallel processing is performed by the linear sensors 180a indicated by 1 in circle to 4 in circle, four distance measurement circuits 300a are also necessary and the device is increased in size.

Therefore, as another example, it is also conceivable to provide one distance measurement circuit 300a without providing the switching circuit 190 and cause the laser diodes 110a indicated by 1 in circle to 4 in circle to emit lights in order. However, in this case, an output signal of the linear sensor 180a not receiving a signal is also added, noise is quadrupled, and an SN decreases. For example, in this example, a measurement distance decreases to approximately 71% (to ¼-th power of ¼).

The power of the laser diode 110a is limited in order to observe, for example, a safety standard of laser. In such a case, when the plurality of laser diodes 110a (1 in circle to 4 in circle) are used like the laser diodes 110a according to this embodiment, it is sometimes possible to increase the power of a light pulse per pixel of the linear sensor 180a. Consequently, since the power of a light pulse per unit pixel can be increased, a signal S can be increased.

Figure 5:
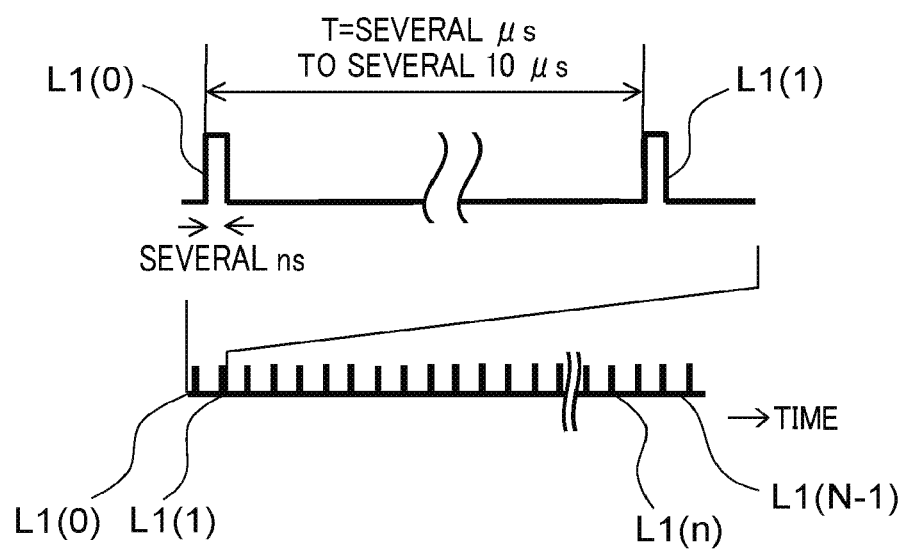
FIG. 5 depicts a diagram schematically showing an emission pattern in one period of a mirror.

An emission pattern example of the light source 11 is explained with reference to FIGS. 5, 6, and 7. FIG. 5 is a diagram schematically showing an emission pattern of the light source 11 in one period of the mirror 15 (FIG. 2). The horizontal axis indicates time. Timing when irradiation of laser light was performed is indicated by the width of a high pulse. One period of the mirror 15 (FIG. 2) corresponds to a one reciprocating vibration motion of the mirror 15 (FIG. 2) as explained with reference to FIG. 6.

A figure on the upper side is an enlarged part view in a figure on the lower side. As shown in FIG. 5, the light source 11 intermittently repeatedly emits laser light L1($n$) (0≤n<N), for example, at an interval of T=several microseconds to several ten microseconds. The laser light L1 emitted n-th is represented as L1($n$). "N" indicates the number of times of irradiation of the laser light L1($n$) in one period of the mirror 15 (FIG. 2). When the irradiation for one period ends, light emission of the laser light L1($n$) (0≤n<N) for the next period is intermittently repeated.

Figure 6:
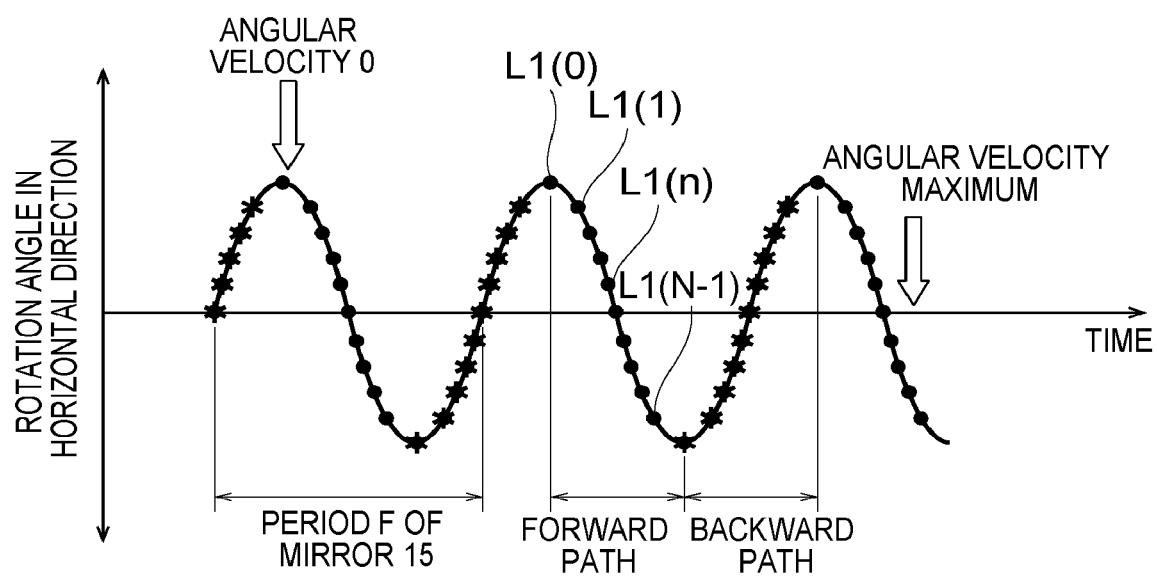
FIG. 6 depicts a diagram for explaining a period of the mirror and irradiation timing.

FIG. 6 is a diagram for explaining a period of the mirror 15 and irradiation timing. The vertical axis of FIG. 6 indicates a rotation angle in the horizontal direction of the mirror 15 (corresponding to, for example, the deflection angle with respect to the vibration axis RA1 shown in FIG. 2) and the horizontal axis indicates time. As indicated by a range of a forward path, the mirror 15 starts rotation in a forward direction from a predetermined angle, for example, 60 degrees, further rotates a predetermined angle, for example, 120 degrees, and stops at −60 degrees. As indicate by a range of a backward path, the mirror 15 starts rotation in a backward direction from a predetermined angle, for example, −60 degrees, further rotates a predetermined angle, for example, −120 degrees, and stops. In this way, the mirror 15 performs a reciprocating motion of repeating the forward rotation in the forward path and the backward rotation in the backward path. The one reciprocating vibrating motion of the mirror 15 (FIG. 2) corresponds to one period.

Circles in FIG. 6 indicate an irradiation timing example of the laser light L1($n$) (0≤n<N). FIG. 6 shows an example in which irradiation of laser light L1(0) is intermittently started from the start time of the forward path and laser light L1(N−1) is irradiated at the end time of the backward path. On the other hand, the irradiation of the laser light is stopped in the backward path. Marks x in FIG. 6 indicate irradiation stop of the laser light.

In this embodiment, irradiation of the laser light L1($n$) (0≤n<N) only in one period of the forward path or the backward path is referred to as "one-side irradiation" and irradiation of the laser light L1($n$) (0≤n<N) in both the periods of the forward path and the backward path is referred to as "both-side irradiation".

Figure 7A:
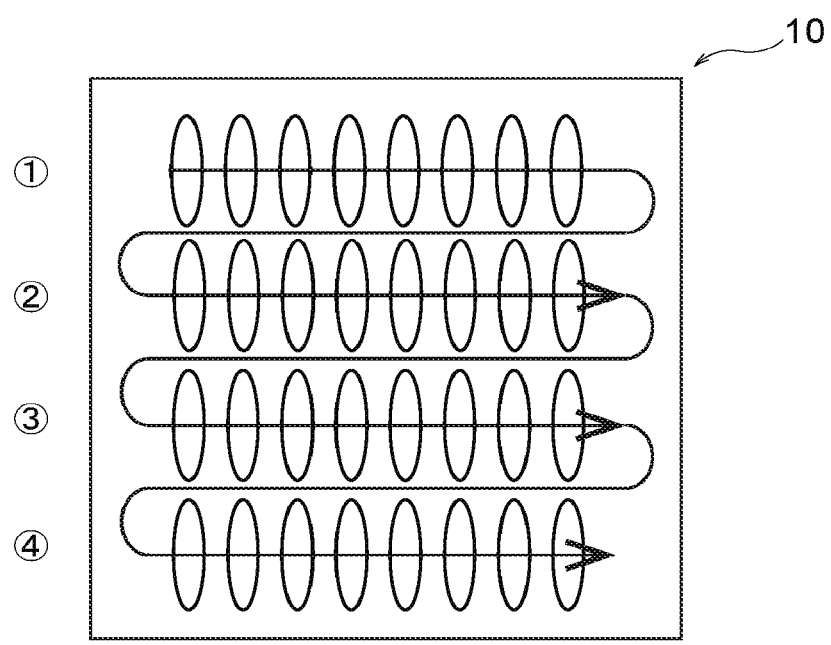
FIG. 7A depicts a schematic diagram showing an example of an irradiation pattern of laser light irradiated on a measurement target object irradiated on one side.

FIG. 7A is a schematic diagram showing an example of irradiation patterns of laser lights irradiated on the measurement target object 10 in the one-side irradiation. Irradiation lines indicated by 1 in circle to 4 in circle correspond to the laser diodes 110a (FIG. 4) indicated by 1 in circle to 4 in circle. To simplify explanation, in the example, the laser diodes 110a (FIG. 4) indicated by 1 in circle to 4 in circle irradiate lights for one period. However, irradiation by the laser diodes 110a is not limited to this.

As shown in FIG. 7, for example, the laser diode 110a corresponding to 1 in circle emits light in the first forward path of the mirror 15 (FIG. 2). In the next forward path, the laser diode 110a corresponding to 2 in circle emits light. An irradiation path of the laser diode 110a (FIG. 4) corresponding to 1 in circle and an irradiation path of the laser diode 110a (FIG. 4) corresponding to 2 in circle deviate from each other in a y direction as indicated by the irradiation lines indicated by 1 in circle and 2 in circle. In this way, it is possible to change the irradiation line for each of the laser diodes 110a (FIG. 4) indicated by 1 in circle to 4 in circle. In order to change the irradiation line, irradiation directions of the laser diodes 110a indicated by 1 in circle to 4 in circle with respect to the optical axis L1 of the irradiation optical system 202 (FIG. 2) may be changed or the vibration axis RA2 of the mirror 15 (FIG. 2) may be changed in every light emission of the laser diodes 110a indicated by 1 in circle to 4 in circle.

Figure 7B:
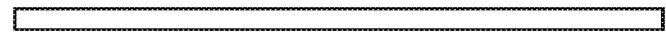
FIG. 7B depicts a diagram showing an example of laser light irradiated on the polygon mirror.
Figure 7C:
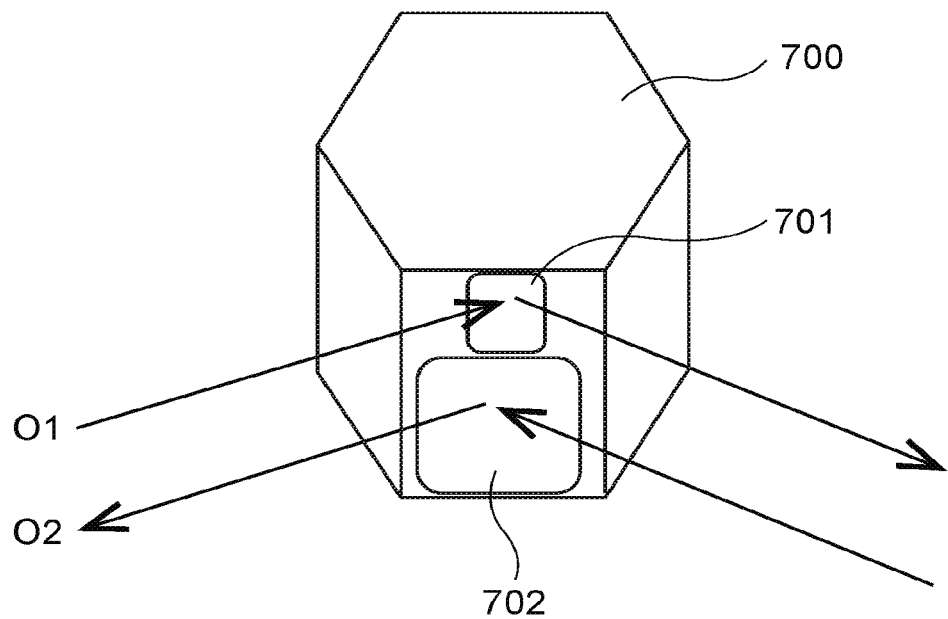
FIG. 7C depicts a diagram showing an example of a polygon mirror.

As means for performing the scanning shown in FIG. 7A, there is, for example, a polygon mirror having different tilt angles shown in FIGS. 7B and 7C. FIG. 7B is a diagram showing an example of laser light having an elongated shape in the longitudinal direction irradiated on an irradiation surface 701 (FIG. 7C) of the polygon mirror. FIG. 7 C is a diagram showing, for example, an example of a polygon mirror 700 disposed in the position of the mirror 15 (FIG. 2). The projected laser light hits O1, and the light returned from the object hits O2. The irradiation surfaces 701 and 702 shown in FIG. 7C have different tilt angels for each of surfaces. Consequently, when the polygon mirror 700 rotates, an irradiation direction of irradiated laser light changes in the vertical direction.

Figure 8:
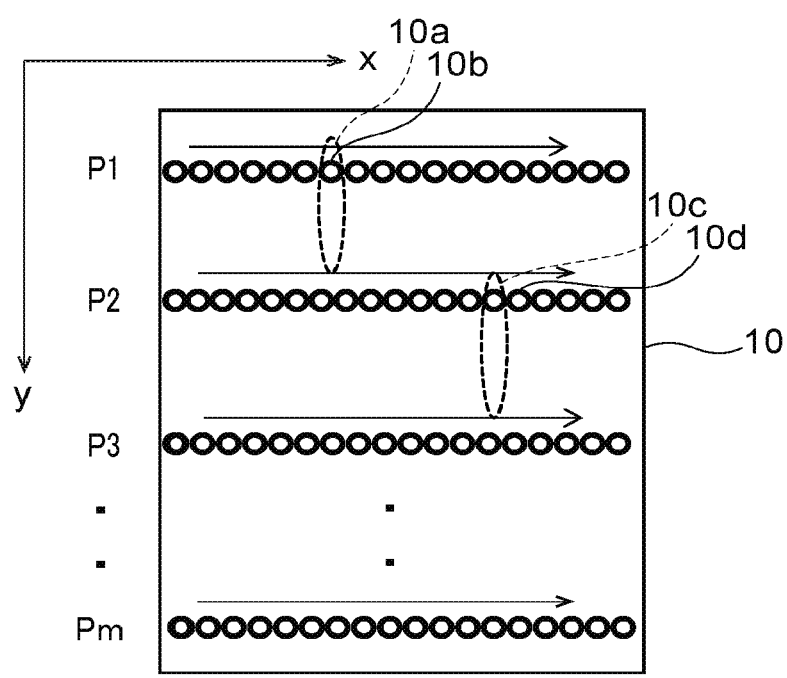
FIG. 8 depicts a diagram schematically showing an irradiation range of laser light in the measurement target object and an irradiation range corresponding to one pixel.

A laser irradiation range for each of pixels of the linear sensors 180a (FIG. 4) is explained with reference to FIG. 8. FIG. 8 is a diagram schematically showing irradiation ranges 10a and 10c of laser light in the measurement target object 10 and irradiation ranges 10b and 10d corresponding to one pixel. P1 to P3 indicate lines of the one-side irradiation performed by the laser diodes 110a (FIG. 4) indicated by 1 in circle to 3 in circle in order. In this way, in an example shown in FIG. 8, the laser diodes 110a (FIG. 4) indicated by 1 in circle to n in circle change the irradiation lines in they direction while performing the one-side irradiation in order.

The irradiation range 10a indicates a range of one shot of laser irradiated by the laser diode 110a (FIG. 4) indicated by 1 in circle. The irradiation range 10b indicates an irradiation range of laser light received by a first pixel (CH1) of the linear sensor 180a indicated by 1 in circle. In this way, the irradiation range 10b (FIG. 4) of light reception by the first pixel (CH1) of the laser diode 110a (FIG. 4) indicated by 1 in circle moves as time elapses. In FIG. 8, for simplification, only the irradiation range 10b of the light reception by the first pixel (CH1) is shown. However, actually, the irradiation range 10a includes, for example, in one vertical row, the irradiation ranges 10b of light reception by respective first to thirty-second pixels (CH1 to CH32) of the linear sensor 180a (FIG. 4) indicated by 1 in circle. That is, the irradiation ranges 10b relate to spatial resolution of a distance image.

Similarly, the irradiation range 10c indicates a range of one shot of laser irradiated by the laser diode 110a (FIG. 4) indicated by 2 in circle. The irradiation range 10d indicates an irradiation range of laser light received by the first pixel (CH1) of the linear sensor 180a (FIG. 4) indicated by 2 in circle. In this way, the irradiation range 10b of light reception by the first pixel (CH1) of the laser diode 110a indicated by 2 in circle moves as time elapses.

An example of a time-series luminance signal B(m) for one laser light emission of a present frame f(m) is explained with reference to FIG. 9A. A frame means a combination of cyclically repeated emissions of the laser light L1. For example, a distance value for one distance image is acquired by, for example, a combination of emissions of the laser light L1 for one frame.

Figure 9A:
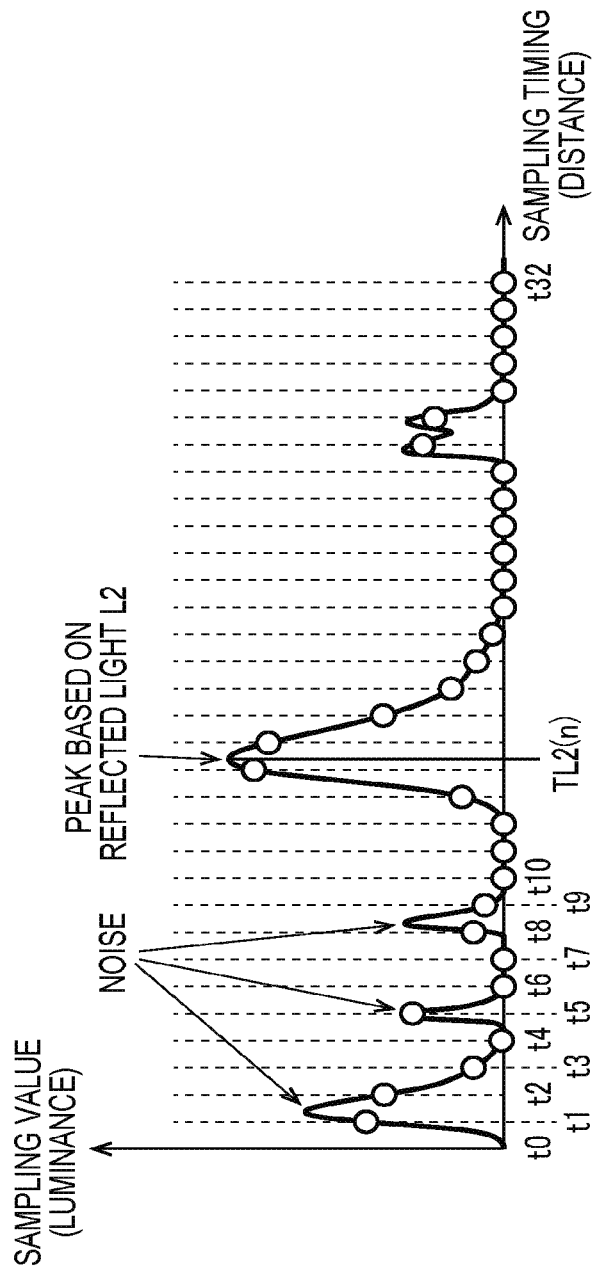
FIG. 9A depicts a diagram showing an example of a time-series luminance signal of a present frame.

FIG. 9A is a diagram showing an example of the time-series luminance signal B(m). That is, FIG. 9A is a diagram showing an example of a sampling value obtained by sampling, with the signal generation circuit 20 (FIG. 2), an output signal output by one pixel (CH) of the linear sensor 180a (FIG. 4). The horizontal axis of FIG. 9A indicates sampling timing and the vertical axis of FIG. 9A indicates a sampling value, that is, a luminance value of the time-series luminance signal B(m). In the time-series luminance signal B(m), m ($0 \leq m < M$) indicates a number of a frame f.

For example, sampling timings obtained by adding a blanking time to sampling timings t0 to t32 correspond to an elapsed time "T" (FIG. 5) from when the laser light L1(n) is irradiated until the next laser light L1(n+1) is irradiated. A peak in the figure is a sampling value based on the reflected light L2. Sampling timing TL2 indicating the peak corresponds to a double of the distance to the measurement target object 10.

More specifically, the distance is calculated by the following expression: distance=light speed×(sampling timing TL2−timing when the photodetector 17 detects the laser light L1)/2. The sampling timing is an elapsed time from light emission start time of the laser light L1.

In a time-series luminance signal B(m, x, y), m ($1 \leq m \leq M$) indicates a number of the frame f and a coordinate (x, y) indicates a coordinate decided based on an irradiation direction of the laser light L1. That is, the coordinate (x, y) corresponds to a coordinate at the time when a distance image and a speed image of the present frame f(m) are generated. For example, as shown in FIG. 8, coordinates of the respective irradiation ranges 10b and 10d corresponding to one pixel are indicated by the coordinate (x, y). Luminance signals of coordinates near to one another may be integrated and used as the luminance signal B(m, x, y). For example, luminance signals in coordinate ranges of 2×2, 3×3, and 5×5 may be integrated. Such processing for integrating the luminance signals in the coordinate ranges of 2×2, 3×3, and 5×5 is sometimes called averaging. The integration is a technique for adding time-series luminance information of a coordinate (for example, a coordinate (x+1, y+1)) near or adjacent to the coordinate (x, y) to time-series luminance information of the coordinate (x, y) to calculate final time-series luminance information. The integration is a technique for improving an S/N in this way. That is, final time-series luminance information can include the time-series luminance information of the near or adjacent coordinates. Further, for simplification, the coordinates (x, y) of a time-series luminance signal B(m−1, x, y) and the time-series luminance signal B(m, x, y) according to this embodiment are explained as the same. However, the former coordinate may be a near or adjacent coordinate thereof.

Figure 9B:
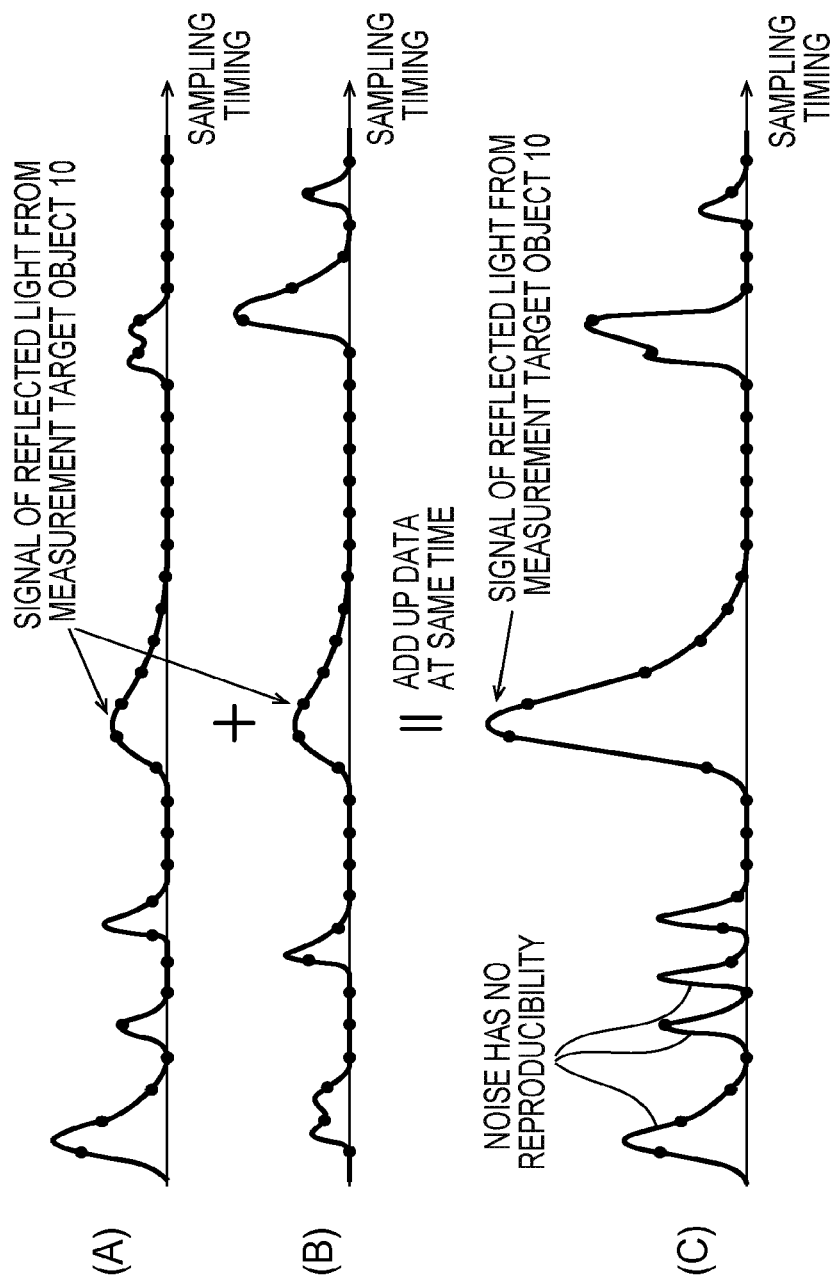
FIG. 9B depicts a diagram showing an averaging processing example.

An example of the averaging processing (time-division integration) performed by the averaging processor 22 (FIG. 3) is more specifically explained. FIG. 9B is a diagram showing the averaging processing example. (A) indicates a time-series luminance signal output by a pixel n included in the linear sensor 180a. (B) indicates a time-series luminance signal output by, for example, a pixel near or adjacent to the pixel n included in the linear sensor 180a. (C) indicates a time-series signal obtained by integrating the time-series luminance signal of (A) and the time-series luminance signal of (B). The vertical axes of (A) and (B) indicate a luminance value and the horizontal axes of (A) and (B) indicate a time starting from time of laser light emission.

As indicated by (C), since noise occurs at random, when a plurality of time-series luminance signals are integrated, noise is relatively reduced compared with a signal. On the other hand, since the signal occurs at substantially the same time, when the plurality of time-series luminance signals are integrated, the signal is relatively increased. In this way, when the averaging processing (the time-division integration) is performed, noise (N), which occurs at random, relatively decreases and, conversely, a signal (S) relatively increases. Therefore, an S/N of the time-series luminance signal subjected to the averaging processing is improved.

Note that time-series luminance signals may be integrated by weighting the time-series luminance signal with a weight value corresponding to a time-series correlation between the time-series luminance signals with the averaging processor. Consequently, a time-series correlation between time-series luminance signals from the same measurement target object 10 is higher than a time-series correlation between time-series luminance signals from a reflecting object different from the measurement target object 10. Therefore, the weight value is larger. Consequently, the series-luminance signals from the same measurement target object 10 are integrated more than the time-series luminance signals from the reflecting object different from the measurement target object 10. Therefore, the S/N is further improved.

Special irradiation pattern examples proposed here of the optical mechanism system 200 (FIG. 2) are explained with reference to FIGS. 2 and 4 and with reference to FIGS. 10A to 16. As explained below, the special irradiation patterns are useful for acquiring high-resolution distance image data in a device scanned at high speed to a certain degree such as an MEMS or a polygon mirror. Note that, when the device is scanned at higher speed, for example, the method described in Japanese Patent Laid-Open No. 2019-52981 is useful. First, an example of "skipping" is explained with reference to FIGS. 10A and 11. The laser diodes 110a (FIG. 4) indicated by 1 in circle to 4 in circle respectively correspond to LD1 to LD4. An irradiation pattern of the "skipping" is described in, for example, Japanese Patent Laid-Open No. 2019-52981.

Figure 10A:
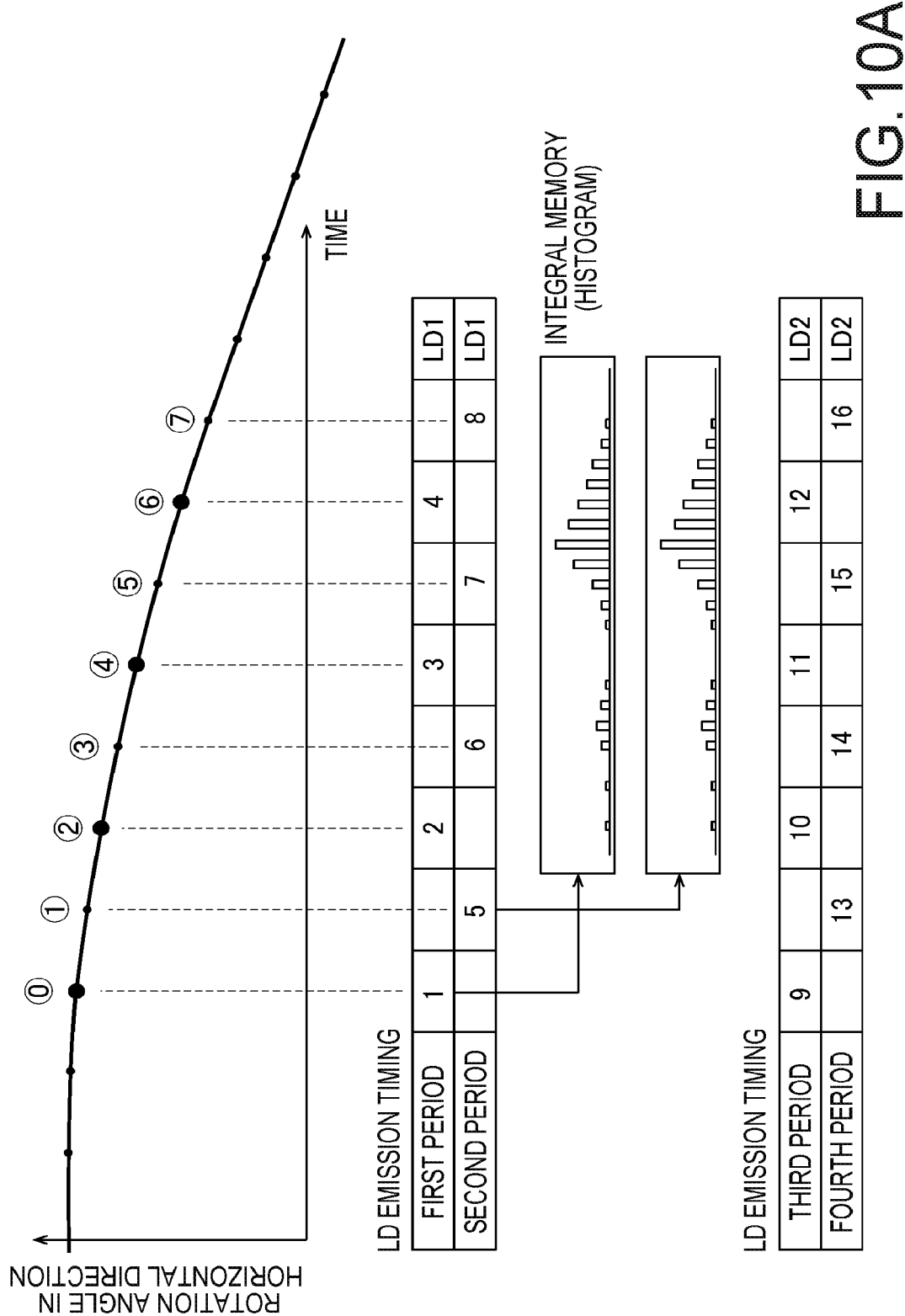
FIG. 10A depicts a schematic diagram for explaining an irradiation pattern of skipping.

FIG. 10A is a schematic diagram for explaining the irradiation pattern of the skipping. An upper figure of FIG. 10A shows a rotation angle (in the case of an MEMS, corresponding to a deflection angle) in the horizontal direction of the mirror 15 (FIG. 2), that is, a rotation angle of the vibration axis RA1 and irradiation timing of the laser diode 110a (FIG. 4). The vertical axis indicates the rotation angle and the horizontal axis indicates time. 0 in circle, 2 in circle, 4 in circle, 6 in circle, and the like indicate irradiation timings of the laser diode 110a (FIG. 4) in respective first and third periods of the mirror 15. 1 in circle, 3 in circle, 5 in circle, 7 in circle, and the like indicate irradiation timings of the laser diode 110a (FIG. 4) in respective second and fourth periods of the mirror 15.

A table in FIG. 10A indicates irradiation order of the laser diodes 110a (FIG. 4). LD1 corresponds to the laser diode 110a (FIG. 4) indicated by 1 in circle. LD2 corresponds to the laser diode 110a (FIG. 4) indicated by 2 in circle. To simplify explanation, explanation of the laser diodes 110a (FIG. 4) indicated by 3 in circle and 4 in circle is omitted.

In the first period, the laser diode LD1 irradiates laser light in order in the positions of 0 in circle, 2 in circle, 4 in circle, 6 in circle, and the like. Numbers 1 to 16 indicate the irradiation order. For simplification, only 1 to 16 are described. However, actually, for example, several hundred or more positions are sometimes present in the irradiation order in one period. In the second period, the laser diode LD1 irradiates laser lights in order in the positions of 1 in circle, 3 in circle, 5 in circle, 7 in circle, and the like. Consequently, the laser diode LD1 irradiates the laser lights in the irradiation positions indicated by 1 in circle, 3 in circle, 5 in circle, and 7 in circle in the second period to supplement the irradiation positions indicated by 0 in circle, 2 in circle, 4 in circle, and 6 in circle in the first period.

Similarly, in the third period, the laser diode LD2 irradiates laser lights in order in the positions indicated by 0 in circle, 2 in circle, 4 in circle, 6 in circle, and the like. In the fourth period, the laser diode LD2 irradiates laser lights in order in the positions indicated by 1 in circle, 3 in circle, 5 in circle, 7 in circle, and the like. Consequently, the laser diode LD2 irradiates the laser lights in the irradiation positions indicated by 1 in circle, 3 in circle, 5 in circle, and 7 in circle in the fourth period to supplement the irradiation positions indicated by 0 in circle, 2 in circle, 4 in circle, and 6 in circle in the third period. In this way, a pattern for irradiating laser lights to supplement irradiation positions on the same line in the "one-side irradiation" is referred to as "skipping" in this embodiment. Note that, in the "skipping", the laser light may be irradiated on the same line or the line may be changed in the up-down direction (for example, in the y direction in FIG. 7).

For example, when the mirror 15 is configured by an MEMS, a resonance frequency of the MEMS mirror is generally high and a period of vibration of the MEMS mirror is short. On the other hand, a lower limit is present in an emission interval (time) of a laser interval from specifications of a maximum distance measurement distance. As a result, the number of times of irradiation in one period decreases. That is, resolution in an irradiation direction of the laser light L1 in the horizontal direction sometimes becomes rough in an irradiation interval of the time interval T shown in FIG. 5. The resolution in the irradiation direction of the laser light L1 in the horizontal direction can be made finer by performing the irradiation pattern by the "skipping". It is possible to maintain the resolution in the horizontal direction.

A histogram in FIG. 10A shows, for example, an integration example of time-series luminance signals with respect to one pixel of the linear sensor 180a (FIG. 4) indicated by 1 in circle at irradiation timing of "1". For example, luminance signals in a coordinate range around 3×5 centering on a pixel corresponding to "1" are weighted and integrated. Similarly, the histogram shows an integration example of time-series luminance signals with respect to one pixel of the linear sensor 180a (FIG. 4) indicated by 1 in circle at irradiation timing of "5".

Figure 10B:
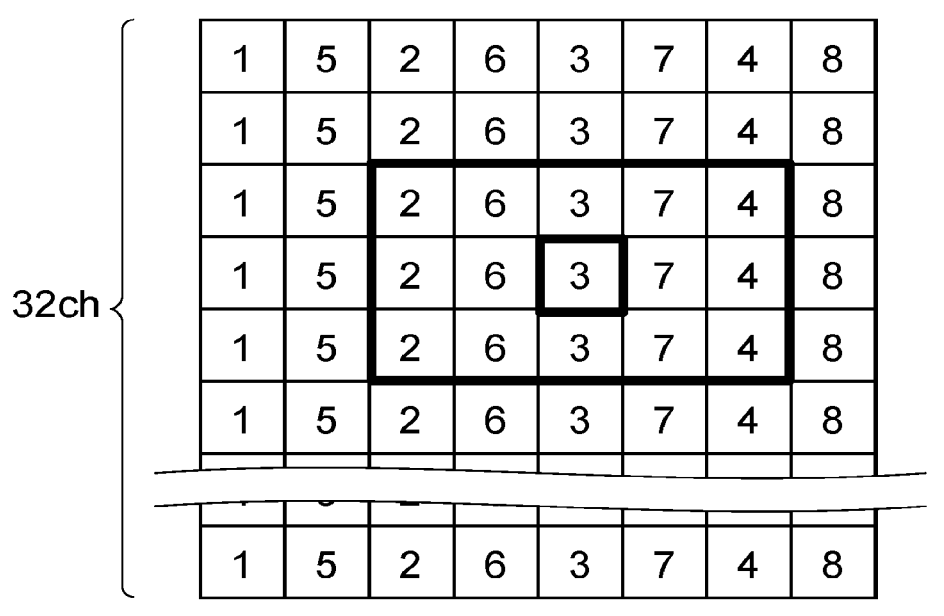

An example in which time-series luminance signals in a coordinate range around 3×5 in the "skipping" are weighted and integrated is explained with reference to FIG. 10B. FIG. 10B is a diagram showing an example of 3×5 weighted integration in the "skipping". Numbers in FIG. 10B indicate irradiation order for each 1 ch. For example, time-series luminance signals in a coordinate range around 3×5 are weighted and integrated centering on irradiation order "3". In this way, in the "skipping", although pixels different in irradiation order are disposed in adjacent pixels in the horizontal direction of the center pixel "3", the resolution in the irradiation direction can be made finer. An S/N in an integration value of the time-series luminance signals is improved. As explained above, weight is calculated using, for example, the time-series correlation between time-series luminance signals.

Figure 11:
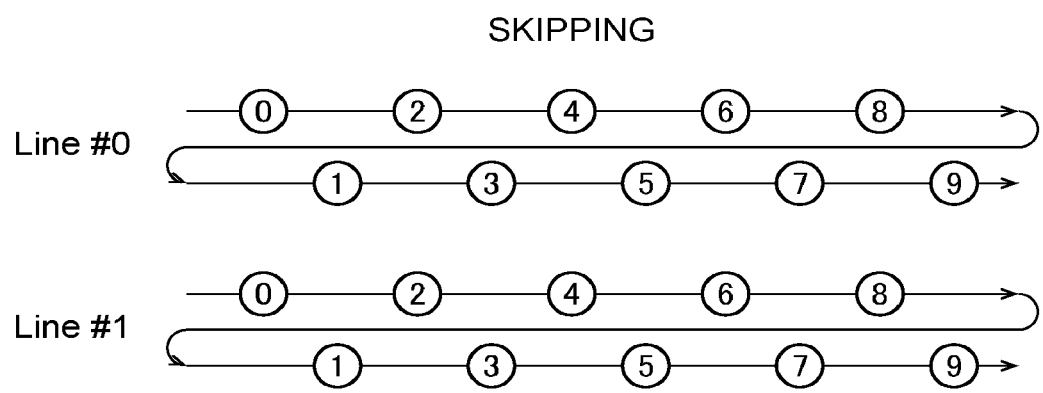
FIG. 11 depicts a diagram schematically showing an irradiation pattern example of the skipping.

FIG. 11 is a diagram schematically showing an irradiation pattern example of the skipping. "Line #0" indicates a relation between order of data obtained in a pixel "#0" and irradiation positions of the laser light L1. 0 in circle to 9 in circle correspond to, for example, 0 in circle to 9 in circle in FIG. 10A (8 in circle and 9 in circle are not shown in FIG. 10A). Similarly, "Line #1" indicates a relation between order of data obtained in a pixel "#1" and the irradiation positions of the laser light L1. 0 in circle to 9 in circle correspond to, for example, 0 in circle to 9 in circle in FIG. 10A (8 in circle and 9 in circle are not shown in FIG. 10A). As explained above, in the irradiation pattern example of the skipping, irradiation positions of the laser diode 110a may be shifted in the y direction (FIG. 8). In this case, for example, the vibration axis RA2 (FIG. 2) of the mirror 15 is changed.

Figure 12:
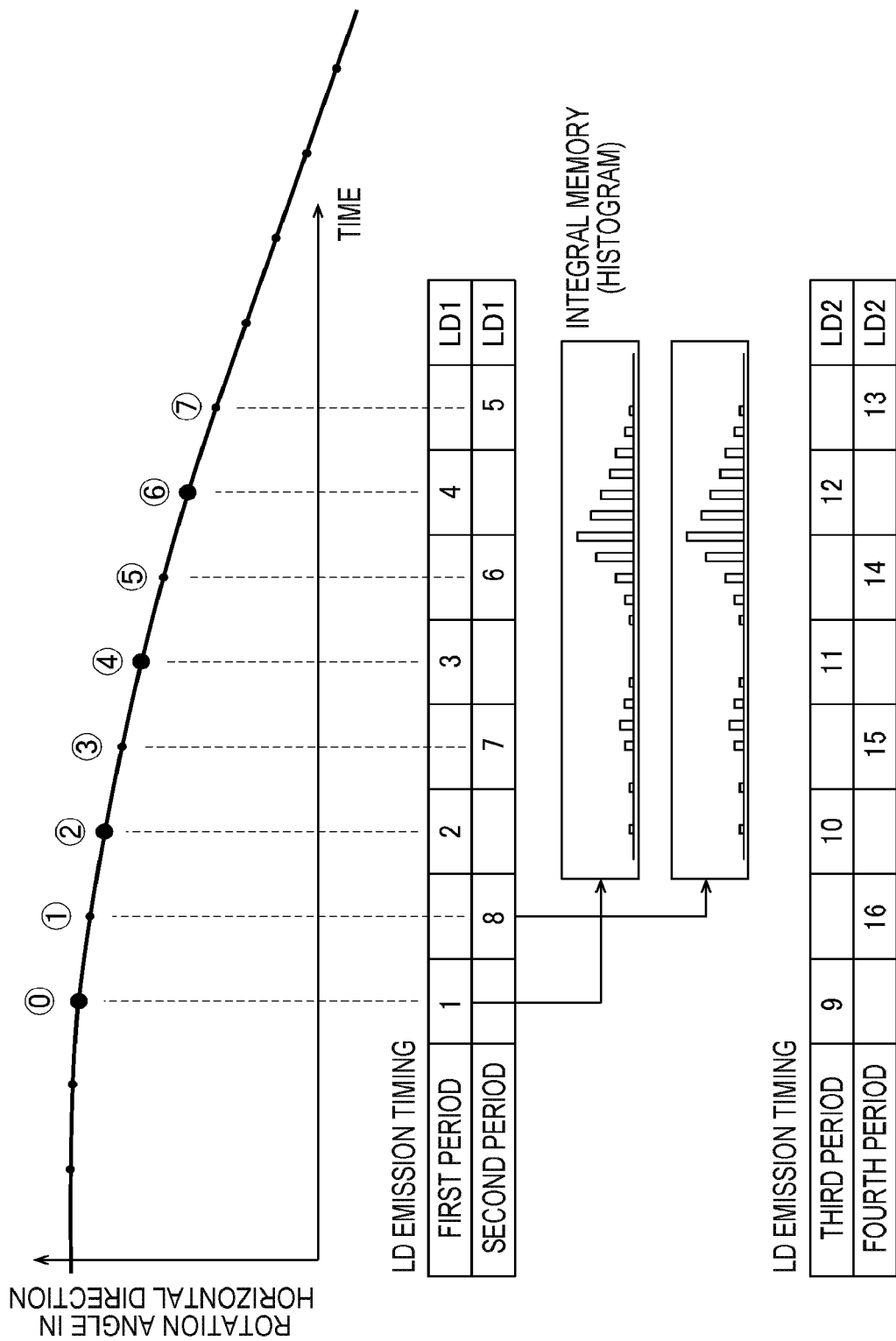
FIG. 12 depicts a diagram for explaining an example of turnaround.

Subsequently, an example of "turnaround" is explained with reference to FIGS. 12 to 14. The "turnaround" is an irradiation pattern example of the "both-side irradiation". FIG. 12 is a diagram for explaining an example of the "turnaround". The figures are the same as FIG. 10A. That is, in FIG. 12, irradiation order of the laser diodes LD1 and LD2 is different from the irradiation order shown in FIG. 10A.

More specifically, in the first period, the laser diode LD1 irradiates laser lights in order in the positions indicated by 0 in circle, 2 in circle, 4 in circle, 6 in circle, and the like. Numbers 1 to 16 indicate irradiation order. In the second period, the laser diode LD1 irradiates laser lights in order in the positions indicated by 7 in circle, 5 in circle, 3 in circle, 1 in circle, and the like. Consequently, the laser diode LD1 irradiates laser lights in the irradiation positions indicated by 7 in circle, 5 in circle, 3 in circle, and 1 in circle in the second period to supplement the irradiation positions indicated by 0 in circle, 2 in circle, 4 in circle, and 6 in circle in the first period.

Similarly, in the third period, the laser diode LD2 irradiates laser lights in order in the positions indicated by 0 in circle, 2 in circle, 4 in circle, 6 in circle, and the like. In the fourth period, the laser diode LD2 irradiates laser lights in order in the positions indicated by 7 in circle, 5 in circle, 3 in circle, 1 in circle, and the like. Consequently, the laser diode LD2 irradiates laser lights in the irradiation positions indicated by 7 in circle, 5 in circle, 3 in circle, and 1 in circle in the fourth period to supplement the irradiation positions indicated by 0 in circle, 2 in circle, 4 in circle, and 6 in circle in the third period.

For example, when the mirror 15 is configured by an MEMS, an irradiation interval of the laser light L1 in the horizontal direction sometimes becomes rough at an irradiation interval of the time interval T shown in FIG. 5. The irradiation interval of the laser light L1 in the horizontal direction can be made finer by performing the irradiation pattern by the "turnaround". It is possible to maintain the resolution in the horizontal direction. Further, since the "both-side irradiation" is performed, it is possible to perform irradiation at the same number of points in a shorter time than the "one-side irradiation". Note that the both-side irradiation of laser light is described in, for example, Japanese Patent Laid-Open No. 2019-52981.

Figure 13:
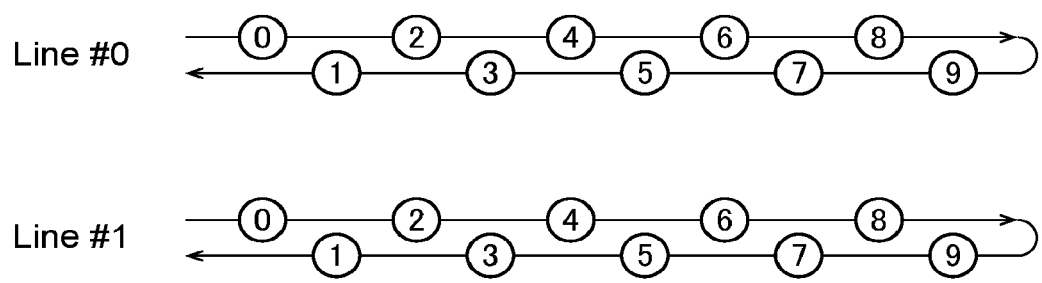
FIG. 13 depicts a diagram schematically showing an irradiation pattern example of the turnaround.

FIG. 13 is a diagram schematically showing an irradiation pattern example of the turnaround. "Line #0" indicates a relation between order of data obtained in the pixel "#0" and irradiation positions of the laser light L1. 0 in circle to 9 in circle correspond to, for example, 0 in circle to 9 in circle in FIG. 12 (the number of horizontal pixels is larger than that in FIG. 12 by two). Similarly, "Line #1" indicates a relation between order of data obtained in the pixel "#1" and irradiation positions of the laser light L1. 0 in circle to 9 in circle correspond to, for example, 0 in circle to 9 in circle in FIG. 12 (the number of horizontal pixels is larger than that in FIG. 12 by two). Note that, in the irradiation pattern example of the turnaround, the irradiation positions of the laser diode 110a may be shifted in the y direction (FIG. 8).

Figure 14:
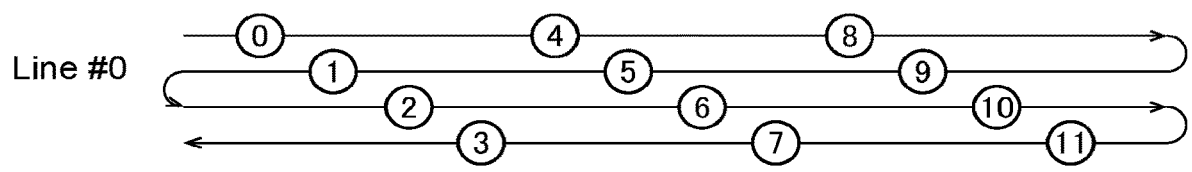
FIG. 14 depicts a diagram schematically showing an irradiation pattern example of turnaround for two periods.
Figure 14:
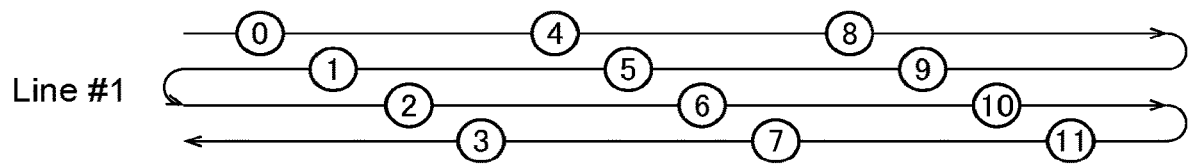

FIG. 14 is a diagram schematically showing an irradiation pattern example of the turnaround for two periods. "Line #0" indicates a relation between order of data obtained in the pixel "#0" and irradiation positions of the laser light L1. 0 in circle to 11 in circle correspond to, for example, 0 in circle to 11 in circle in FIG. 12 (8 in circle to 11 in circle are not shown in FIG. 12). Similarly, "Line #1" indicates a relation between order of data obtained in the pixel "#1" and irradiation positions of the laser light L1. 0 in circle to 11 in circle correspond to, for example, 0 in circle to 11 in circle in FIG. 12 (8 in circle to 11 in circle are not shown in FIG. 12). Note that, in the irradiation pattern example of the turnaround, the irradiation positions of the laser diode 110a may be shifted in the y direction (FIG. 8).

For example, when the mirror 15 is configured by an MEMS, when vibrating speed of the MEMS is higher, or when the measurement target object 10 (FIG. 2) is present at a farther distance, the number of turnarounds is increased. For example, the time interval T (FIG. 5) needs to be secured longer as the distance to the measurement target object 10 increases. That is, horizontal resolution decreases as T increases. On the other hand, since the number of turnarounds can be adjusted in the distance measuring device 5 according to this embodiment, it is possible to increase the horizontal resolution, for example, even when the vibrating speed of the MEMS is higher or when the measurement target object 10 (FIG. 2) is present at a farther distance.

Figure 15:
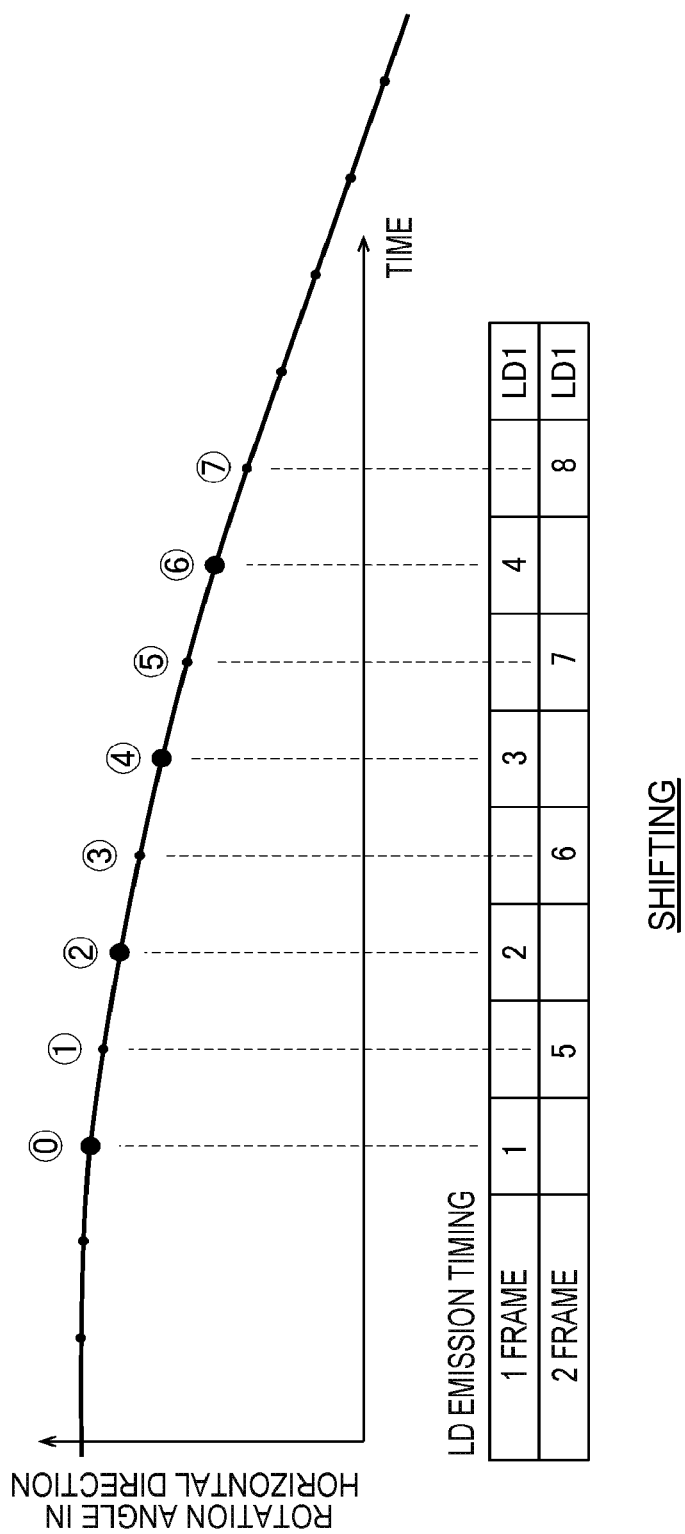
FIG. 15 depicts a diagram for explaining an example of shifting.

An example of "shifting" is explained with reference to FIG. 15. The "shifting" is an irradiation pattern for changing an irradiation position for each frame. FIG. 15 is a diagram for explaining an example of the "shifting". An upper figure of FIG. 15 is the same as FIG. 10A.

In a first frame, the laser diode LD1 irradiates laser lights in order in the positions indicated by 0 in circle, 2 in circle, 4 in circle, 6 in circle, and the like on the same line. Numbers 1 to 8 indicate irradiation order. In a second frame, the laser diode LD1 irradiates laser lights in order in the positions indicated by 1 in circle, 3 in circle, 5 in circle, 7 in circle, and the like on the same line as the line in the first frame. In this way, the laser diode LD1 sets the irradiation positions indicated by 1 in circle, 3 in circle, 5 in circle, and 7 in circle in the second frame in positions shifted with respect to the irradiation positions indicated by 0 in circle, 2 in circle, 4 in circle, and 6 in circle in the first frame and irradiates laser lights. In this way, in photographing of the shifting, it is possible to shift the irradiation positions in the first frame and the second frame. It is possible to supplement distance information in the frames.

Figure 16:
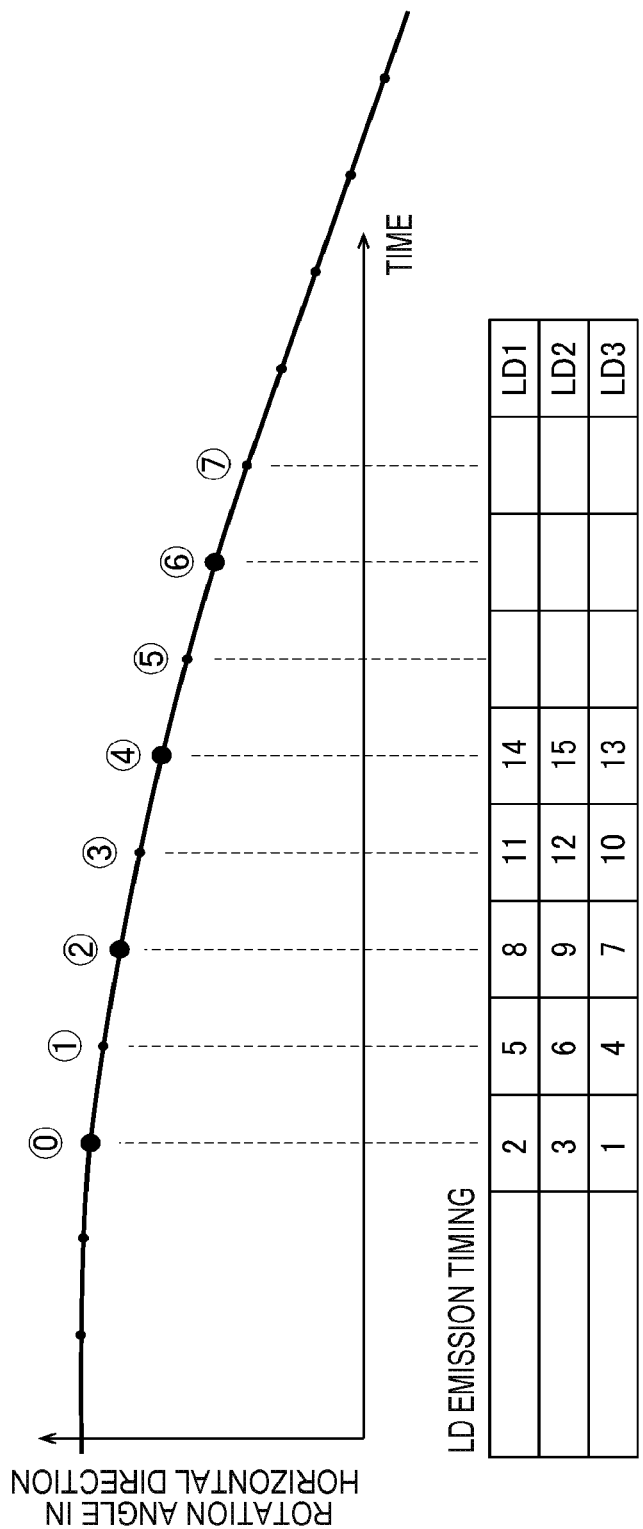
FIG. 16 depicts a diagram for explaining an example of switching and replacement.

An example of "switching and replacement" is explained with reference to FIG. 16. The "switching and replacement" is an irradiation method for switching irradiation order of the laser diodes LD1 to LD3 and replacing switching order. FIG. 16 is a diagram for explaining the example of the "switching and replacement". An upper figure of FIG. 16 is the same as FIG. 10A. In the position indicated by 0 in circle, laser lights are irradiated in the order of the laser diodes LD3, LD1, and LD2. Irradiation positions of the laser diodes LD1, LD2, and LD3 are shifted in the y direction (FIG. 8). In the position indicated by 1 in circle, laser lights are irradiated in the order of the laser diodes LD1, LD3, and LD2. In this way, in the position indicated by 0 in circle, irradiation is switched in the order of the laser diodes LD3, LD1, and LD2. In the position indicated by 1 in circle, irradiation is switched in the order of the laser diodes LD1, LD3, and LD2.

In this way, in this embodiment, switching the laser diodes LD1, LD2, and LD3 in any order and causing the laser diodes LD1, LD2, and LD3 to emit lights in the same vibration position of the mirror 15 is referred to as "switching". Changing the light emission order of the laser diodes LD1, LD3, and LD2 when changing the vibration position of the mirror 15 and, for example, changing the vibration position of the mirror 15 from the position indicated by 0 in circle to the position indicated by 1 in circle is referred to as "replacement". In photographing of the switching and the replacement, it is possible to photograph the laser diodes LD1, LD2, and LD3 at one period of the mirror 15. It is possible to further improve temporal correlation among the pixels in the vertical direction.

When irregular irradiation such as the turnaround, the skipping, and the switching and replacement explained above is not performed, averaging processing can be performed using a time-series luminance signal of the irradiation and time-series luminance signals of several times of irradiation at most before the irradiation. When the number of time-series luminance signals are minimum, accumulators (histogram memories) for integrating the time-series luminance signals only have to be prepared by the number of channels. However, when the irregular irradiation such as the turnaround, the skipping, and the switching and replacement is performed, in some case, adjacent pixels are not continuously irradiated and were irradiated long time ago. Therefore, in the averaging, the time-series luminance signals irradiated long time ago or data replacing the time-series luminance signals are necessary. In general, it is desired to retain data (a frame memory) of an entire frame. Conversely, if the frame memory is retained, it is possible to use data of not only the present frame but also the preceding frame for the averaging (inter-frame averaging) and thereby improve an SN ratio.

Figure 17:
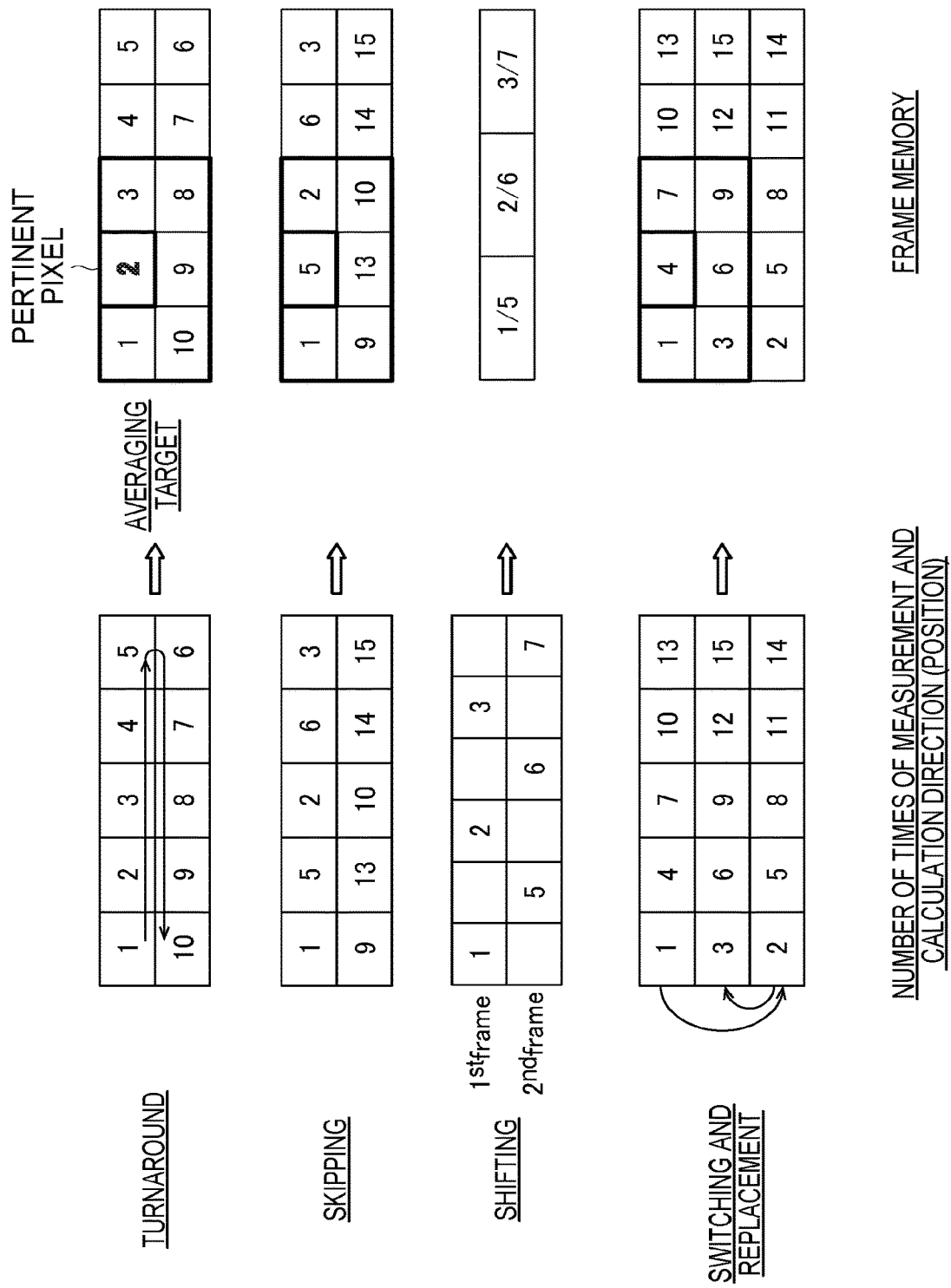
FIG. 17 depicts a diagram showing coordinate conversion examples with respect to irradiation pattern examples.

Coordinate conversion examples and storage examples of data with respect to the irradiation pattern examples are explained with reference to FIG. 17. FIG. 17 is a diagram showing the coordinate conversion examples with respect to the irradiation pattern examples. Examples of the "turnaround", the "skipping", the "shifting", and the "switching and replacement" are shown in order from the top. The left side shows the coordinate conversion examples and the right side shows storage examples in the frame memory and range examples of the averaging processing. As in the past, when coordinates are allocated in the order of storage in the storage circuit (the frame memory) 21 (FIG. 2), deviation between the coordinates and coordinates in space positions occur. Then, spatial filter processing such as averaging processing among frames cannot be performed. Therefore, the signal processing circuit 22 (FIG. 2) rearranges acquired data according to an actual measurement direction and an actual positional relation. More specifically, the signal processing circuit 22 (FIG. 2) acquires, from the control circuit 16 (FIG. 2), information concerning irradiation timing of the laser light L1 (FIG. 2) and information concerning a rotation position of the mirror 15 (for example, angles of the vibration axes RA1 and RA2 and a type of the mirror 15) and sets a coordinate on the basis of these kinds of information. Note that the signal processing circuit 22 (FIG. 2) according to this embodiment corresponds to the setting circuit. In the following explanation, for simplification, an example in which only one pixel is present in each linear sensor 180a (FIG. 4) is explained.

In the example of the "turnaround", numbers indicate irradiation order of laser light. In a normal storing method, a coordinate of a pixel indicated by 6 is shown at the left end and a coordinate of a pixel indicated by 10 is shown at the right end. In this embodiment, the signal processing circuit 22 (FIG. 2) rearranges data according to the actual measurement direction and the actual positional relation. Therefore, the coordinate of the pixel indicated by 6 is corrected to the right end and the coordinate of the pixel indicated by 10 is corrected to the left end. Consequently, it is possible to, for example, add up a pixel 2 and a peripheral pixel to perform the averaging processing.

In the example of the "skipping", numbers indicate irradiation order of laser light (FIG. 10A). In the normal storing method, for example, a coordinate of a pixel indicated by 2 is next to 1 and, for example, a coordinate of a pixel indicated by 3 is a middle position. In this embodiment, the signal processing circuit 22 (FIG. 2) rearranges data according to the actual measurement direction and the actual positional relation. Therefore, the coordinate of the pixel indicated by 2 is corrected to the third from the left end and a coordinate of a pixel indicated by 3 is corrected to the right end. Consequently, it is possible to, for example, add up a pixel 5 and a peripheral pixel and perform averaging processing. In this way, the signal processing circuit 22 (FIG. 2) changes a coordinate setting method according to the one-side irradiation for irradiating the laser light L1 (FIG. 2) in only one of the forward rotation and the backward rotation and the both-side irradiation for irradiating the laser light L1 in both of the forward rotation and the backward rotation.

In the example of the "shifting", numbers indicate irradiation order of laser light (FIG. 15). In the example of the "shifting", 1 in a first frame and 5 in a second frame are stored as the same coordinate. In "1/5" and "2/6", pixels adjacent to each other between frames can be treated as the same coordinate when 1 and 5 are treated as the same coordinate and 2 and 6 are treated as the same coordinate, whereby inter-frame averaging is performed.

In the example of the "switching and replacement", numbers indicate irradiation order of laser light (FIG. 16). In the normal storing method, for example, a coordinate of a pixel indicated by 4 is next to 3 and, for example, a coordinate of a pixel indicated by 5 is next to 4. In this embodiment, the signal processing circuit 22 (FIG. 2) rearranges data according to the actual measurement direction and the actual positional relation. Therefore, the coordinate of the pixel indicated by 4 is corrected to the second from the left end and the coordinate of the pixel indicated by 5 is corrected to the second from the left end. Consequently, it is possible to, for example, add up a pixel 4 and a peripheral pixel and perform the averaging processing.

Note that the examples of the "turnaround", the "skipping", the "shifting", and the "switching and replacement" are explained above. However, the "turnaround", the "skipping", the "shifting", and the "switching and replacement" may be combined. For example, laser beam is sometimes irradiated by the "turnaround" in the preceding frame and is irradiated by the "skipping" in the present frame. Alternatively, laser beam is sometimes irradiated by the "turnaround" in one third of the present frame, irradiated by the "skipping" in the next one third of the present frame, and irradiated by the "shifting" in the next one third of the present frame.

Data storage examples 1 to 5 concerning distance images and identification information among coordinates that cannot be treated as adjacent pixels are explained with reference to FIGS. 18 and 19. These data are used for, for example, averaging processing. Small squares correspond to coordinates. For example, 1 (CH1) indicates 1 channel (CH1), that is, a coordinate of first data based on an output of a first pixel and 1(CH2) indicates 2 channel (CH2), that is, a coordinate of first data based on an output of a second pixel.

FIG. 18 is a diagram showing data storage examples 1 and 2 concerning distance images or time-series luminance signal data. For simplification, channels indicated by 1 in circle to 3 in circle of the linear sensor 180a (FIG. 4) are 2 channels (CH1 and CH2) and irradiation points in the horizontal direction are three points.

That is, the data storage example 1 is a data storage example of the "skipping" and the data storage example 2 is a data storage example of the "turnaround". More specifically, numbers indicate irradiation order. CH1 indicates data based on an output of a first pixel of the linear sensor 180a (FIG. 4) indicated by 1 in circle. For example, 1(CH1)

means first data in the 1 channel (CH1). Similarly, 4(CH2) means fourth data in the irradiation order based on an output of the 2 channel (CH2) of the linear sensor 180*a* (FIG. 4) indicated by 2 in circle. Similarly, 9(CH2) means ninth data in the irradiation order based on an output of the 2 channel (CH2) of the linear sensor 180*a* (FIG. 4) indicated by 3 in circle. "D.C." means non-storage. For example, as shown in FIG. 8, since the irradiation ranges 10*b* and 10*d* or the like of the channels are spatially related, the example shown in FIG. 18 is an example in which the coordinates may be treated as adjacent pixels.

Figure 19:
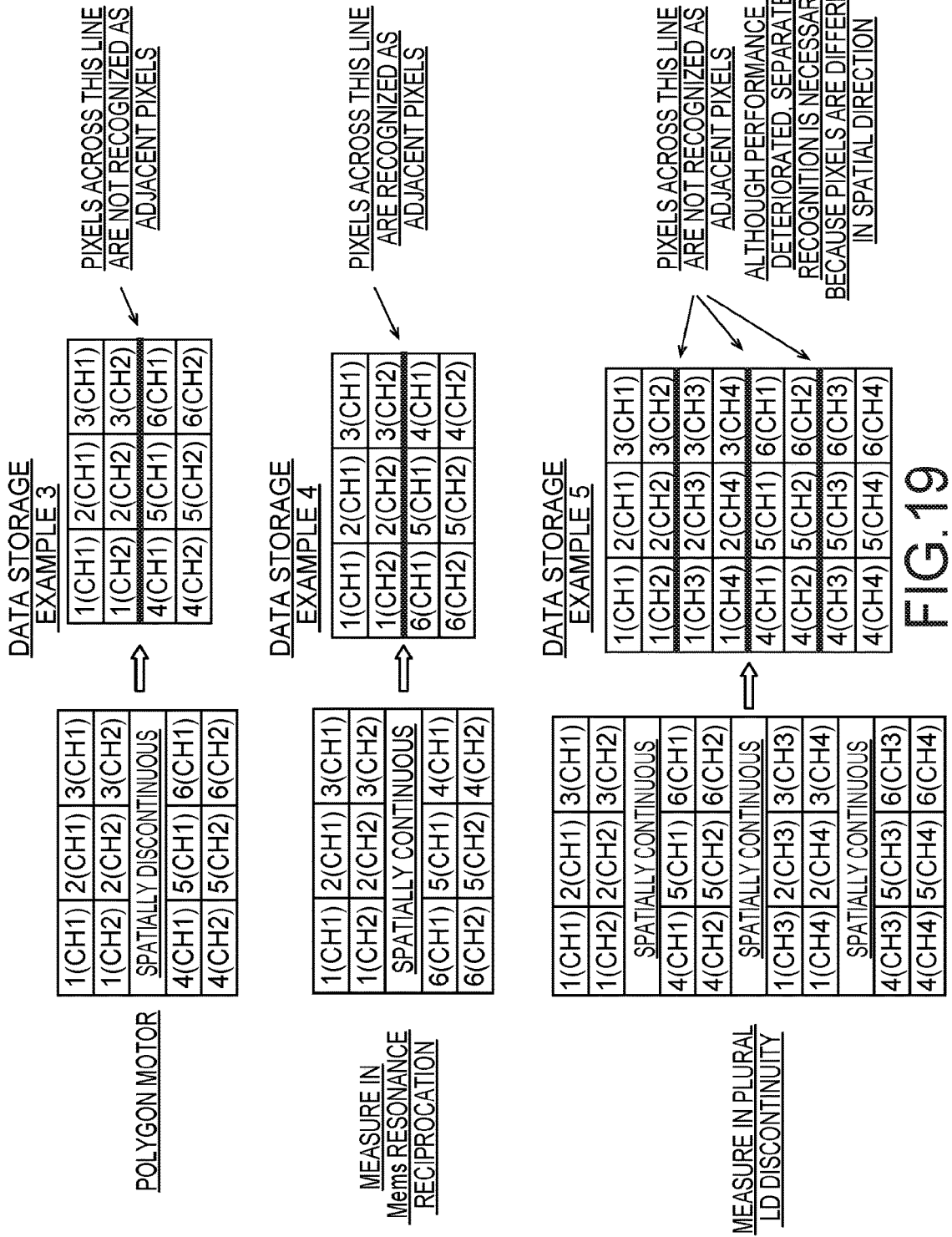
FIG. 19 depicts a diagram showing data storage examples 3 to 5 concerning distance images.

FIG. 19 is a diagram showing data storage examples 3 to 5 concerning distance images. Small squares correspond to coordinates. A figure on the left side is a figure schematically showing a relation between the number of times of Start and a spatial direction of distance measurement. The "number of times of Start" is an identifier (a number) of a scanning line for scanning in the vertical direction. In the case of a polygon motor, the number of times of Start corresponds to, for example, irradiation surfaces of the polygon mirror. In the case of scanning in the vertical direction (FIG. 4) by the plurality of laser diodes 110*a*, the number of times of Start corresponds to any one of 1 in circle to 4 in circle. The "spatial direction of distance measurement" means, in particular, a laser irradiation direction of the vertical direction and corresponds to a coordinate in the longitudinal direction. "Spatially discontinuous" indicates that irradiation ranges (for example, 10*b* and 10*d* in FIG. 8) in a measurement space corresponding to upper and lower coordinates are discontinuous. "Spatially continuous" indicates that irradiation ranges (for example, 10*b* and 10*d* in FIG. 8) in a measurement space corresponding to upper and lower coordinates are continuous. A figure on the right side is a data storage example. The signal processing circuit 22 (FIG. 2) acquires, from the control circuit 16 (FIG. 2), information concerning irradiation timing of the laser light L1 (FIG. 2) and information concerning a rotation position of the mirror 15 (for example, angles of the vibration axes RA1 and RA2 and a type of the mirror 15) and gives, on the basis of these kinds of information, identification information to coordinates that cannot be treated as adjacent pixels.

The storage example 3 is, for example, a data storage example in the case in which a polygon motor is used as the optical mechanism system 200 (FIG. 1). For simplification, the number of times of Start is 2, channels indicated by 1 in circle and 2 in circle of the linear sensor 180*a* (FIG. 4) are 2 channels (CH1 and CH2), and irradiation points in the horizontal direction are three points. A polygon mirror driven by the polygon motor horizontally rotates, whereby irradiation surfaces of the polygon mirror discontinuously change. The irradiation surfaces are, for example, six surfaces. Angles of the surfaces are different. A scanning direction is generally horizontal. However, peculiar distortions are present in the surfaces. The surfaces bend near the peripheries of the surfaces. Consequently, an irradiation direction of laser light irradiated by the polygon mirror is not continuous between adjacent irradiation surfaces. Deviation sometimes spatially occurs. It is undesirable to perform averaging concerning pixels (coordinates) on different irradiation surfaces. In this case, the laser diodes 110*a* (FIG. 4) may be switched in 1 in circle 1 to 4 in circle according to the switching of the polygon mirror or only one laser diode 110*a* may be used. For example, as in the storage example 3, when the number of times of Start is 2 and only one laser diode 110*a* is used, types of irradiation angles in the vertical direction are 2×1=2 types. For example, when the number of times of Start is 2 and the laser diodes 110*a* (FIG. 4) are switches in 1 in circle to 4 in circle, types of irradiation angles in the vertical direction are 2×4=8 types.

In the data storage example 3, a spatial relation in such a case is schematically shown in the left figure and a storage example is shown in the right figure. As shown in the right figure, the signal processing circuit 22 (FIG. 2) gives identification information to coordinates that cannot be treated as adjacent pixels. In this way, when respective continuous coordinates correspond to the laser lights L1 (FIG. 2) irradiated by the different mirror surfaces of the polygon mirror, the signal processing circuit 22 (FIG. 2) gives information not treated as adjacent pixels. The information not treated as adjacent pixels is associated with the coordinates and stored in the storage circuit 21 (FIG. 2).

The data storage example 4 is an example of the "both-side irradiation" like, for example, the data storage example 2. For simplification, the number of times of Start is two, channels indicated by 1 in circle and 2 in circle of the linear sensor 180*a* (FIG. 4) are 2 channels (CH1 and CH2), and irradiation points in the horizontal direction are three points. As shown in the left figure, identification information to the coordinates that cannot be treated as adjacent pixels because the coordinates are spatially continuous is not given.

The data storage example 5 is an example of the "one-side irradiation". For simplification, the number of times of Start is four, channels of the linear sensor 180*a* (FIG. 4) are 4 channels (CH1 to CH4), and irradiation points in the horizontal direction are three points. As shown in the left figure, this example is an example in which data is read out in the channels (CH1 and CH2) in the order of the linear sensors 180*a* (FIG. 4) indicated by 1 in circle and 2 in circle and, thereafter, for example, the axis RA2 (FIG. 2) of the mirror 15 is changed, whereby irradiation positions in the vertical direction are changed, and data is read out in the channels (CH3 and CH4) in the order of the linear sensors 180*a* (FIG. 4) indicated by 1 in circle and 2 in circle.

In such a case, data is sometimes stored as indicated by the data storage example 5. In this case, since coordinates sometimes do not continue in a measurement space, the signal processing circuit 22 (FIG. 2) gives identification information to the coordinates that cannot be treated as adjacent pixels. Note that, in FIG. 19, the identification information to the coordinates that cannot be treated as the adjacent pixels is indicated by a horizontal line. However, identification information equivalent to a vertical line may be given. That is, identification information indicating that coordinates of adjacent pixels adjacent in the horizontal direction cannot be treated as adjacent pixels may be given to the coordinates.

A data integration processing example is explained with reference to FIG. 20.

Figure 20:
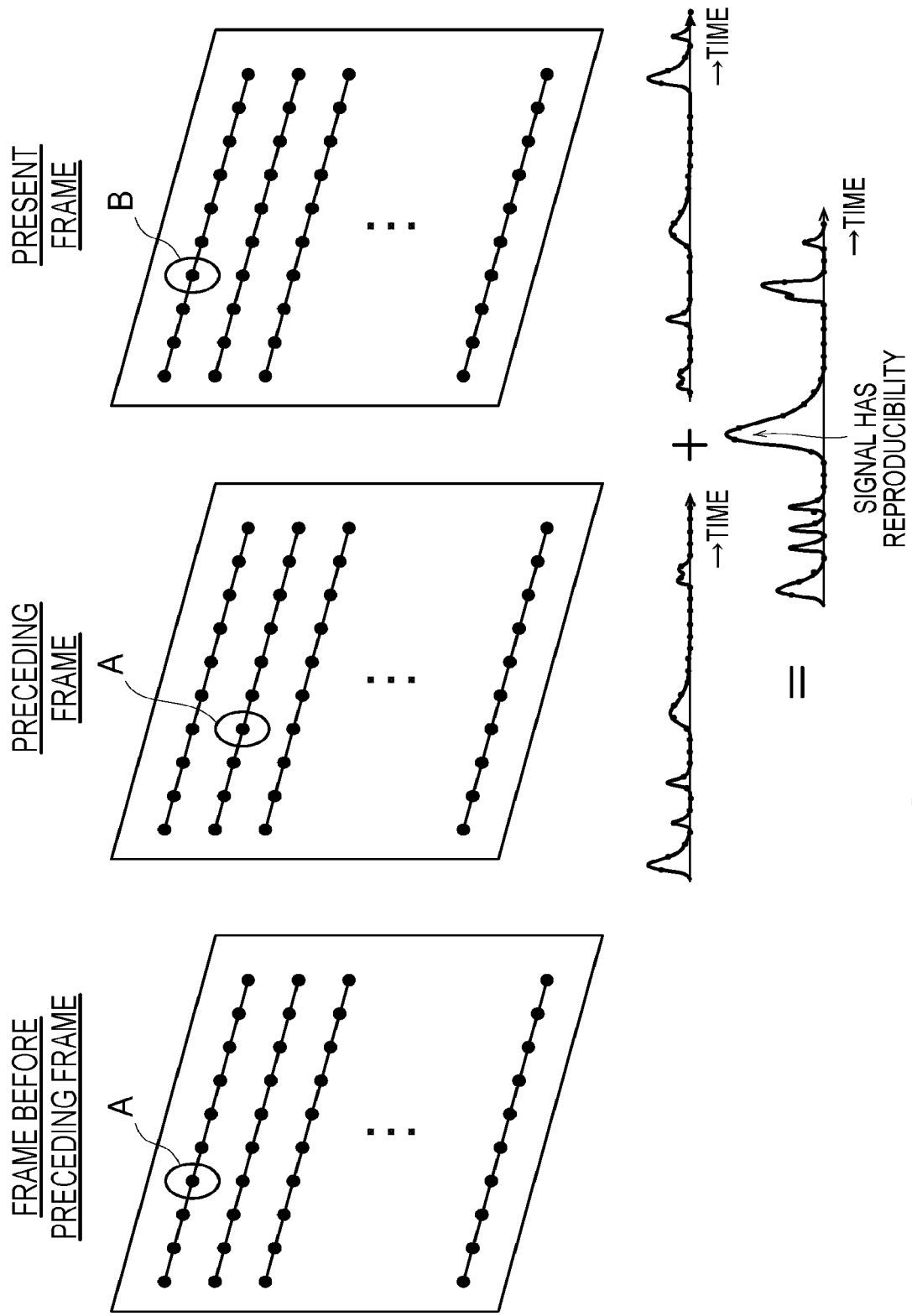
FIG. 20 depicts a diagram showing an integration processing example in which three frames are used.

FIG. 20 is a diagram showing an integration processing example in which three frames are used. As in FIG. 8 referred to above, irradiation ranges in measurement spaces of pixels are indicated by black circles. Reflected lights of laser lights from the black circles are measured by corresponding pixels as time-series luminance signals. However, there are various irradiation methods such as the "turn-around", the "skipping", the "shifting", and the "switching and replacement" for each of the frames. Therefore, as explained above, information concerning pixels that cannot be treated as adjacent pixels by the signal processing circuit 22 (FIG. 2) is set in advance for each of the frames. The left figure in the middle shows a time-series luminance signal example output from a pixel corresponding to A of a preceding frame. The right figure in the middle shows a time-series luminance signal example output from a pixel corresponding to B of a present frame. In the integration processing, time-series luminance signals of the pixel corresponding to B of the present frame and, for example, 3×5 pixels around the pixel and time-series luminance signals output from corresponding pixels of a preceding frame and a frame before the preceding frame are integrated by, for example, weighting processing. A figure in the bottom shows a time-series luminance signal after the integration processing. Noise is suppressed by such processing and measurement accuracy is improved.

These kinds of integration processing can be performed for each of the corresponding pixels in the signal processing circuit 22 shown in FIG. 3A. In this case, according to the identification information, output signals from pixels that cannot be spatially treated as adjacent pixels are not integrated. Therefore, deterioration in an S/N ratio of an integrated signal is suppressed.

As shown in FIG. 20, when averaging is performed using the time-series luminance information of the preceding frame and the frame before the preceding frame, the distance measuring device 5 includes a large memory for storing these kinds of time-series luminance information. Wrong distance measurement is likely to be performed according to old information before the preceding frame. Therefore, a method of performing averaging using information of frames before the preceding frame while reducing these problems and a method of selecting a peak of a time-series luminance signal B(m, x, y) are explained with reference to FIGS. 21 to 23.

In this embodiment, a predetermined number of peaks selected in descending order of values of peaks out of peaks of the time-series luminance signal B(m, x, y) are referred to as first selection peaks. Peaks selected using an adjacent distance NDis of a preceding frame f(m−1) besides the first selection peaks are referred to as second selection peaks. Peaks based on the measurement target object 10 sometimes cannot be selected only with the first selection peaks.

First, an example in which the peaks based on the measurement target object 10 cannot be selected only with the first selection peaks is explained with reference to FIG. 21.

Figure 21:
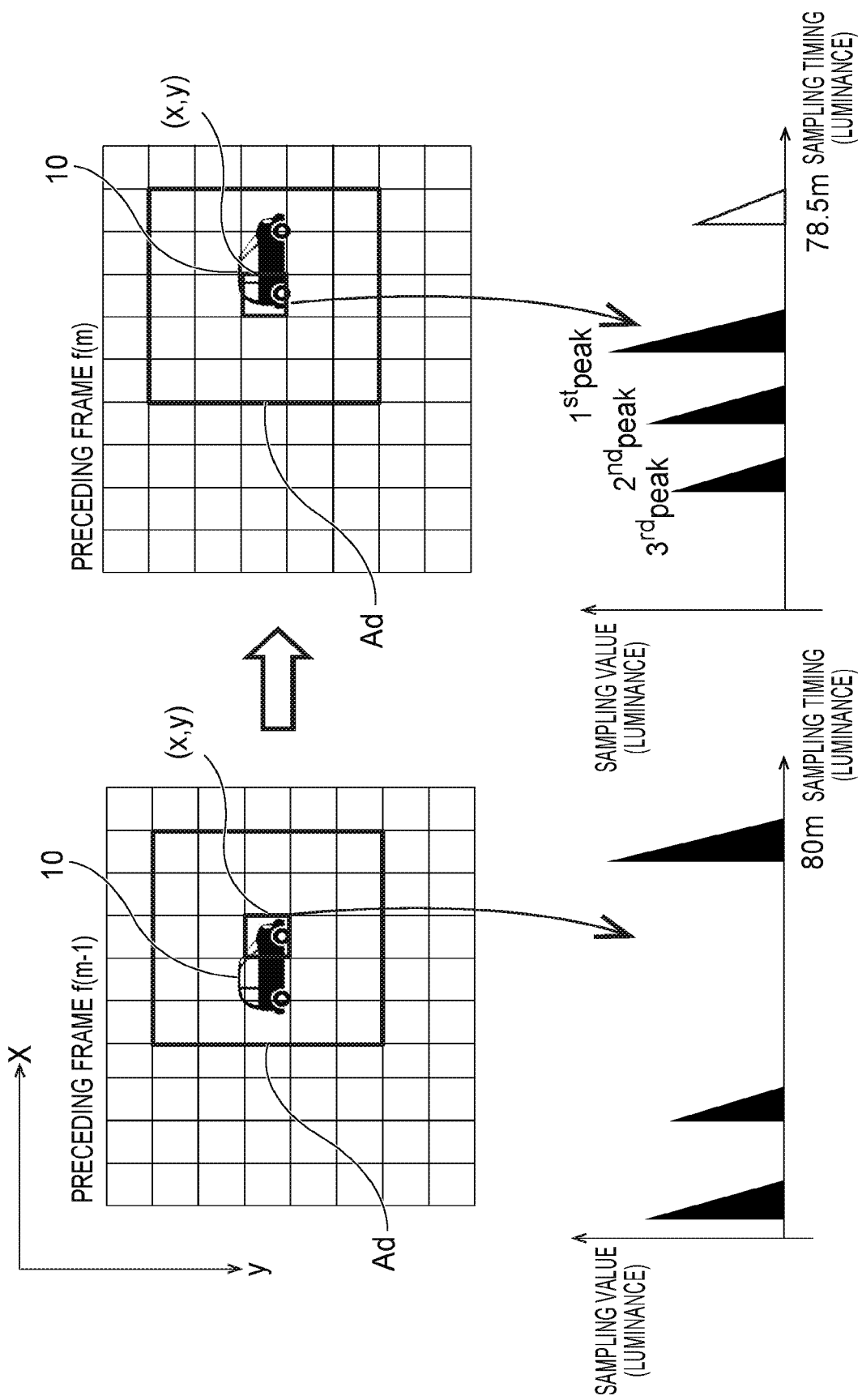
FIG. 21 depicts a diagram schematically showing adjacent regions of coordinates in a preceding frame and a present frame and time-series luminance signals.

FIG. 21 is a diagram schematically showing an example of an adjacent region Ad and the time-series luminance signal B(m−1, x, y) of the coordinate (x, y) in the preceding frame f(m−1) and the adjacent region Ad the time-series luminance signal B(m, x, y) of the coordinate (x, y) in the present frame f(m). The upper left figure shows the adjacent region Ad of the coordinate (x, y) in the preceding frame f(m−1), the lower left figure shows the time-series luminance signal B(m−1, x, y) in the coordinate (x, y), the upper right figure shows the adjacent region Ad of the coordinate (x, y) in the present frame f(m), and the lower right figure shows the time-series luminance signal B(m, x, y) of the coordinate (x, y) in the present frame f(m). A center coordinate (x, y) of the adjacent region Ad is indicated by a thick line. The measurement target object 10 is, for example, an automobile and is present 80 meters ahead on the optical axis O1 of the illumination optical system 202 in the distance measuring device 5 (FIG. 2). In FIG. 21, the automobile is shown as moving from the left to the right along an x axis. However, this is only an example in which the automobile is drawn laterally to make it easy to see the automobile. The automobile may move back and forth. The adjacent region Ad is a coordinate range of (2*nd+1)×(2*nd+1) centering on the coordinate (x, y): nd is a constant for specifying an adjacent pixel range and is 2.

As shown in FIG. 21, in the time-series luminance signal B(m−1, x, y) of the preceding frame f(m−1), a peak corresponding to the position of 80 meters of the measurement target object 10 appears. On the other hand, in an example of the time-series luminance signal B(m, x, y) of the present frame f(m), noise light predominantly appears as first to third peaks and a peak corresponding to a position of 78.5 meters of the measurement target object 10 appears as a fourth peak. The fourth peak corresponding to the position of 78.5 meters of the measurement target object 10 is not included in the first to third peaks, that is, the first selection peaks, a predetermined number of which is three. In such a case, in a general measuring method for setting the first peak as a distance value, the position of 78.5 meters of the measurement target object 10 cannot be obtained.

The adjacent distance NDis obtained in the adjacent region Ad of the coordinate (x, y) in the preceding frame f(m−1) is explained with reference to FIG. 22.

Figure 22:
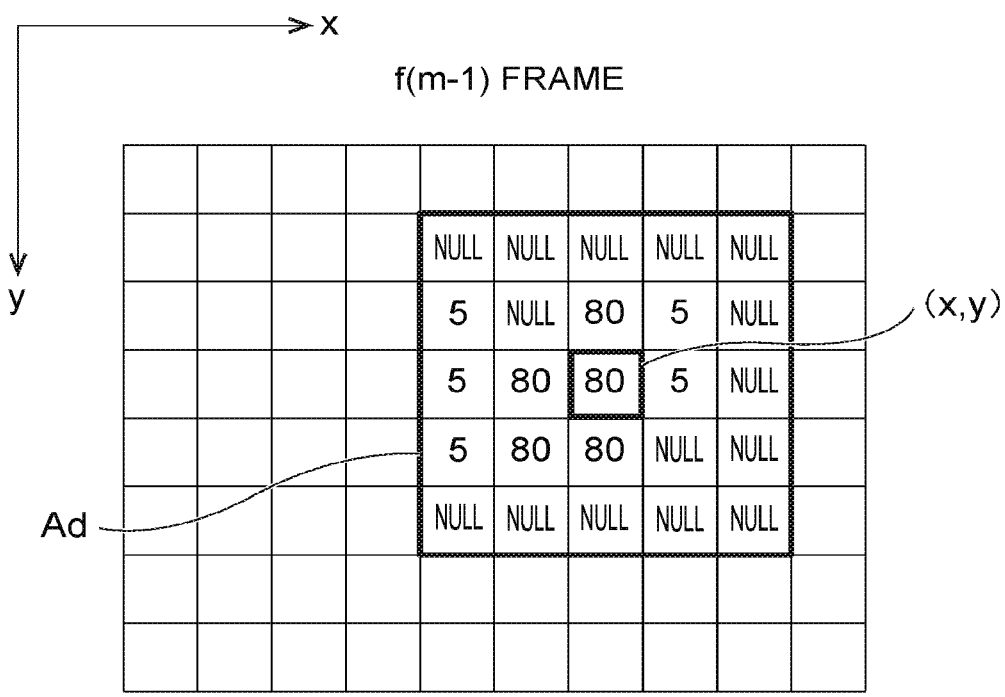
FIG. 22 depicts a diagram showing an adjacent distance obtained in an adjacent region Ad on the basis of the time-series luminance signal in the preceding frame.

FIG. 22 is a diagram corresponding to the upper left figure of FIG. 21 and is a diagram showing an adjacent distance NDis(m−1, X, Y) (x−nd≤X≤x+nd, y−nd≤Y≤y+nd) obtained in the adjacent region Ad on the basis of a time-series luminance signal B(m−1, X, Y) (x−nd≤X≤x+nd, y−nd≤Y≤y+nd) in the preceding frame f(m−1). The center coordinate (x, y) of the adjacent region Ad is indicated by a thick line. For example, the adjacent distance NDis(m−1, X, Y) (x−nd≤X≤x+nd, y−nd≤Y≤y+nd) indicates 5 meters, 80 meters, and NULL. 5 meters indicates a distance to an object other than the measurement target object 10, 80 meters indicates a distance to the measurement target object 10, and NULL is, for example, a space region, a road, or the like in the background and indicates that a reliability degree is low and a measurement value is nullified.

A method of selecting the second selection peaks of the time-series luminance signal B(m, x, y) in the present frame f(m) using the adjacent distance NDis obtained in the adjacent region Ad of the coordinate (x, y) in the preceding frame f(m−1) is explained with reference to FIG. 23.

Figure 23:
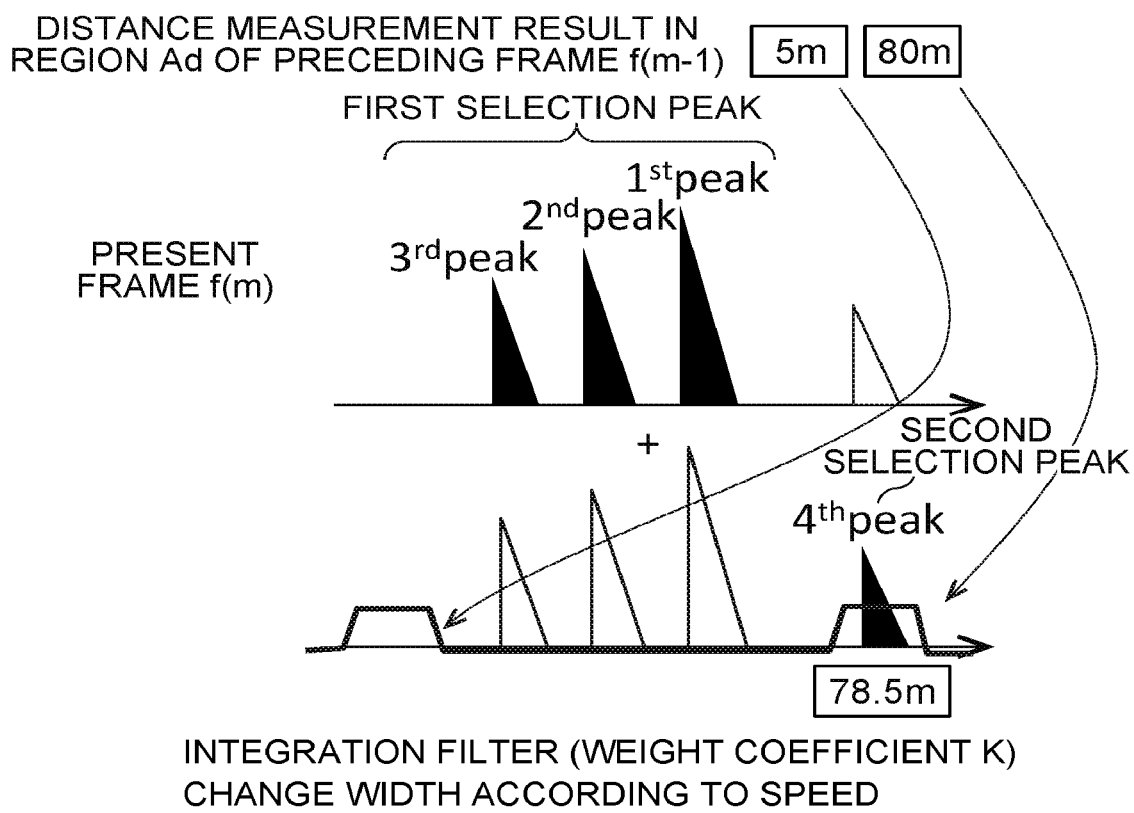
FIG. 23 depicts a diagram showing an example of selection processing of a signal processing circuit.

FIG. 23 is a diagram showing an example of selection processing of the signal processing circuit 22. As shown in FIG. 23, for example, 5 meters and 8 meters indicate the adjacent distance NDis(m−1, X, Y) (x−nd≤X≤x+nd, y−nd≤Y≤y+nd) obtained in the adjacent region Ad (FIG. 22) of the coordinate (x, y). The fourth peak corresponds to the measurement target object 10. However, pixels that cannot be treated as adjacent pixels are excluded from the adjacent distance using the identification information explained with reference to FIG. 21. Consequently, the selection processing is suppressed from being affected by information from coordinates that are not continuous in a measurement space.

The signal processing circuit 22 selects a predetermined number of first selection peaks (the first to third peaks) of the time-series luminance signal B(m, x, y) (0≤x<HN, 0≤y<VN) in the present frame f(m) in order from a largest peak and further selects a predetermined second selection peak (the fourth peak) of the time-series luminance signal B(m, x, y) (0≤x<HN, 0≤y<VN) in the present frame f(m) using the information of adjacent distance (5 meters, 8 meters) in the preceding frame f(m−1). The predetermined number of the first selection peaks is, for example, three. Note that, since a time corresponds to a distance, a time range corresponds to a distance range.

More specifically, the signal processing circuit 22 multiplies the time-series luminance signal B(m, x, y) by an integration filter (a window) having time-series values in which a value in a time range corresponding to the adjacent distance NDis(m−1, X, Y) (x−nd≤X≤x+nd, y−nd≤Y≤y+nd)

obtained in the adjacent region Ad (FIG. 22) of the coordinate (x, y) is a coefficient K and another range is, for example, 0. K is, for example, 1. For example, if one adjacent distance NDis(m−1, X, Y) (x−nd≤X≤x+nd, y−nd≤Y≤y+nd) is 80 meters, a predetermined range centering on a time obtained by dividing 80 meters by light speed and doubling a quotient is a time range corresponding to the adjacent distance of 80 meters. The time range corresponds to the width of the integration filter. A start point of the integration filter is, for example, t0 in FIG. 9A. That is, a range of the integration filter corresponds to, for example, t0 to t32.

In this way, the signal processing circuit 22 selects the predetermined number of peak values in order from the largest peak value as the first selection peaks for each time-series luminance signal B(m, x, y) (0≤x<HN, 0≤y<VN) in the present frame f(m) and further selects the second selection peak values for each time-series luminance signal B(m, x, y) (0≤x<HN, 0≤y<VN) in the present frame f(m) using information of an adjacent distance NDist(m−1, X, Y) (x−nd≤X≤x+nd, y−nd≤Y≤y+nd, 0≤x<HN, 0≤y<VN) in the preceding frame f(m−1).

The signal processing circuit 22 is configured to not select the second selection peaks when an S/N ratio of the luminance signal B(m) exceeds a predetermined value. When the S/N ratio is good, there is hardly any effect by the selection of the second selection peaks and only disadvantages of the second selection peaks remain. For example, a threshold of denoise slightly increases. Accordingly, when the S/N ratio is good, it is possible to improve a measurement result by not selecting the second selection peaks.

As it is seen from the above explanation, it is possible to add the second selection peaks to the first selection peaks as predetermined selection peaks. For example, when noise or the like is mixed and only the first selection peaks are selected, the fourth peak and the like corresponding to the measurement target object 10 are sometimes not selected. On the other hand, by selecting the second selection peaks corresponding to the adjacent distance NDis(m−1, X, Y) (x−nd≤X≤x+nd, y−nd≤Y≤y+nd), it is possible to include, in the second selection peaks, the peaks based on the reflected light from the measurement target 10 even when the fourth peak and the like are not included in the first selection peaks. Further, as explained above, pixels that cannot be treated as adjacent pixels are excluded from the adjacent distance using the identification information explained with reference to FIG. 21. Consequently, the selection processing is suppressed from being affected by information from coordinates that are not continuous in the measurement space.

A processing example for generating a reliability degree R1 representing "likelihood" of peaks is explained. The reliability degree R1 is generated by the signal processing circuit 22 as explained below. The reliability degree R1(p, m, x, y) (0≤p<PN, 0≤x<HN, 0≤y<VN) is formed by a first reliability degree R11(p, m, x, y) (0≤p<PN, 0≤x<HN, 0≤y<VN) for which information concerning the present frame f(m) is used and a second reliability degree R12(p, m, x, y) (0≤p<PN, 0≤x<HN, 0≤y<VN) for which information concerning the preceding frame f(m−1) is also used.

$$R1(p,m,x,y) = \sqrt{R11(p,m,x,y)^2 + R12(p,m,x,y)^2} \quad \text{[Math 1]}$$

In the first reliability degree R1 (p, m, x, y) (0≤p<PN, 0≤x<HN, 0≤x<YN) indicated by Expression (1), the storage circuit 21 has stored therein a distance value D(p, m, x, y) (1≤a≤PN, 0≤x<HN, 0≤x<YN) of a peak "a" of the present frame f(m) and a luminance value Lumi(a, m, x, y) (1≤a≤PN, 0≤x<HN, 0≤x<YN) corresponding to the distance value D(p, m, x, y), a distance value D(a, m−1, x, y) (a=1, 0≤x≤HN, 0≤x<YN) of a peak "a" of the preceding frame f(m−1) and a luminance value Lumi(a, m−1, x, y) (a=1, 0≤x<HN, 0≤x<YN) corresponding to the distance value D(a, m−1, x, y), and information E(m, x, y) (0)(HN, 0≤x<YN) of environment light of the present frame f(m) and information E(m−1, x, y) (0≤x≤HN, 0≤x<YN) of environment light of the preceding frame f(m−1).

In the above expression, "p" is a number of a peak selected by the selection circuit 220 and corresponds to order of sizes of peaks. For example, p=1 indicates the first peak and p=2 indicates the second peak. PN is the number of peaks selected by the selection circuit 220 and is based on a number selected according to an adjacent distance obtained in the adjacent region Ad (FIG. 22). In the above expression, "a" is 1, that is, the distance value D(a, m−1, x, y) of the peak "a" is the same value as the distance value Dis(m−1, x, y). Note that, as the distance value D(a, m−1, x, y) of the preceding frame f(m−1) according to this embodiment, the distance value Dis(m−1, x, y) is used. However, the distance value D(a, m−1, x, y) is not limited to this and may be selected considering the number of couplings of peaks and a luminance values in the time-series luminance signal B(m−1, x, y).

The reliability degree R1(p, m, x, y) indicated by Expression (1) is, for example, a square root of an added-up value of a first reliability degree R11(p, m, x, y) indicated by Expression (2) and a second reliability degree R12 (p, m, x, y) indicated by Expression (3).

The first reliability degree R11(p, m, x, y) (0≤p<PN, 0≤x<HN, 0≤x<YN) is a reliability degree for the distance value D(a, m, x, y) (1≤a≤PN, 0≤x<HN, 0≤x<YN) of the peak "a" of the present frame f(m): where nd1 and nd2 are constants indicating a range of an adjacent region of the coordinate (x, y). For example, nd1=3 and nd2=3.

[Math 2]

$$R11(p, m, x, y) = \sqrt{\sum_{a=1}^{PN} \sum_{X=x-nd1}^{x+nd1} \sum_{Y=y-nd2}^{y+nd2} Q11\{D(a, m, X, Y) - D(p, m, x, y)\} \times Q21(Lumi(a, m, X, Y))^2} \quad (2)$$

[Math 3]

$$R12(p, m, x, y) = \sqrt{\sum_{a=1}^{1} \sum_{X=x-nd1}^{x+nd_1} \sum_{Y=y-nd2}^{y+nd2} Q11\{D(a, m-1, X, Y) - D(p, m, x, y)\} \times Q21(Lumi(a, m-1, X, Y))} \quad (3)$$

[Match 4-1]

$$Q11(D1 - D2) : |D1 - D2| < K \quad (4\text{-}1)$$

[Math 4-2]

$$Q'11(D1, D2, \Delta D2), |D1 - D2 - \Delta D2| \le k_p(D1, \Delta D2), \quad (4\text{-}2)$$
$$k_p(D1, \Delta D2) = k_\delta(D1) + const \times \Delta D2$$

A function Q11(D1-D2) indicated by Expression (4-1) indicates 1 if the distance between a distance value D1 and a distance value D2 is "K" or less and indicates 0 if the distance is larger than "K". For example, "K" is 2 meters. In another example, "K" may be K=max(const1×sqrt(D1), const2). Consequently, the first reliability degree R11(p, m, x, y) indicated by Expression (2) indicates a square sum of the distance value D(p, m, x, y) of the peak p and a luminance value of the peak "a" in an adjacent region having a distance value equal to or smaller than the distance K.

A function Q21(L) indicated by Expression (2) outputs 0 if "L" is equal to or smaller than a threshold TH based on information concerning environment light and outputs "L" if "L" is larger than TH. It is possible to exclude a peak having an S/N larger than a predetermined value according to the function Q21(L).

Information concerning environment light (hereinafter described as environment light E(m, x, y) (0≤x<HN, 0≤x<YN) may be stored in the storage circuit 21 for each coordinate (x, y) of the present frame f(m) and the preceding frame f(m−1). In this case, in Expression (2), a threshold TH(m, x, y) (0≤x<HN, 0≤x<YN) based on the environment light E(m, x, y) (0≤x<HN, 0≤x<YN) is used for each coordinate (x, y). Similarly, in Expression (3), a threshold TH(m−1, x, y) (0≤x<HN, 0≤x<YN) based on the environment light E(m−1, x, y) (0≤x<HN, 0≤x<YN) is used.

As it is seen from this, a large number of peaks "a" having equivalent distance values are present in an adjacent region with respect to the peak p. The first reliability degree R11 increases as a luminance value of the peaks "a" increases. In the peak p corresponding to the measurement target 10, since the peaks "a" having the equivalent distance values occur in the adjacent region, the first reliability degree R11(p, m, x, y) further increases. On the other hand, the peak p corresponding to noise occurs at random. Therefore, the first reliability degree R11 of the peak p corresponding to noise is smaller than the first reliability degree R11 of the peak p corresponding to the measurement target 10.

The second reliability degree R12(p, m, x, y) (1≤p≤PN, 0≤x<HN, 0≤x<YN) is a reliability degree calculated using the distance value D(a, m−1, x, y) (a=1, 0≤x≤HN, 0≤x<YN) of the peak "a" of the preceding frame f(m−1) of the peak p in the present frame f(m). As indicated by Expression (3), the second reliability degree R12(p, m, x, y) indicates a square sum of the distance value D(p, m, x, y) of the peak p and the luminance value of the peak "a" in the adjacent region having the distance value equal to or smaller than the distance K. By setting a=1, it is possible to suppress a storage amount of the storage circuit 21.

Q11' is a discrimination function for specifying an integration filter (a window). The window is determined by a distance $D_2$ of the preceding frame and a change $\Delta D_2$ of the distance $D_2$. $\Delta D_2$ is a distance difference between the preceding frame and the frame before the preceding frame and means a movement of a target. The window is narrower as speed is lower. The influence of environment light noise is reduced.

In Expressions (2) and (3) and Expressions (6), (7), (9), and (10) explained below, Q'11 indicated by Expression (4-2) may be used instead of Q11 indicated by Expression (4-1). Q'11 is a discrimination function for specifying a search window. The search window is determined by a distance D2 of the preceding frame and a change Δ D2 of the distance D2. ΔD2 is a distance difference between the preceding frame and the frame before the preceding frame and means a movement of a target. In the expressions, $k_p(D1)$ is, for example, a monotonously increasing function of D1. The search window is narrower as speed is lower. The influence of environment light noise is reduced.

As it is seen from this, a large number of peaks "a" having equivalent distance values are present in an adjacent region of the preceding frame f(m−1). The second reliability degree R12(p, m, x, y) increases as a luminance value of the peaks "a" increases. In the peak p corresponding to the measurement target 10, since the peak "a" has the equivalent distance in the preceding frame f(m−1) as well, a larger number of the peaks "a" having equivalent distance values occur in the adjacent region. Therefore, the second reliability degree R12 of the peak p corresponding to the measurement target object 10 is larger. On the other hand, the peak p corresponding to noise occurs at random. Therefore, the peaks "a" having equivalent distance values in the adjacent region decrease in the adjacent region according to an occurrence probability of noise. Therefore, the second reliability degree R12 of the peak p corresponding to noise is generally smaller than the second reliability degree R12 of the peak p corresponding to the measurement target 10.

In this way, a larger number of peaks "a" having equivalent distance values are present in the adjacent regions in the preceding frame f(m−1) and the present frame f(m). The reliability degree R1(p, m, x, y) of the peak p corresponding to the measurement target 10 further increases as the luminance value of the peaks "a" increases. On the other hand, the peak p corresponding to noise occurs at random. Therefore, the peaks "a" having equivalent distance values decrease in the adjacent region. Therefore, the reliability degree R1(p, m, x, y) of the peak p corresponding to noise is generally smaller than the reliability degree R1(p, m, x, y) of the peak p corresponding to the measurement target 10.

A second reliability degree R2(p, m, x, y) (0≤p<PN, 0≤x<HM, 0≤x<YN) indicated by Expression (5) is different from the first reliability degree R1(p, m, x, y) in that information concerning environment light is not used. That is, since the environment light is not set as a threshold and a value obtained by deleting luminance of the environment light from luminance is used, the reliability degree R2(p, m, x, y) does not need to retain the environment light information while considering the environment light. In the following explanation, the difference from Expression (1) is explained below. The second reliability degree R2(p, m, x, y) is, for example, a square root of an added-up value of a first reliability degree R21(p, m, x, y) indicated by Expression (6) and a second reliability degree R22(p, m, x, y) indicated by Expression (7). Expression (6) is different from Expression (2) in that the function Q2 is not used. Expression (7) is different from Expression (3) in that the function Q2 is not used. That is, the second reliability degree R2(p, m, x, y) is calculated without using information concerning environment light. Therefore, it is unnecessary to store the information concerning the environment light in the storage circuit 21. It is possible to reduce a storage capacity.

[Math 5]

$$R2(p, m, x, y) = \sqrt{R21(p, m, x, y)^2 + R22(p, m, x, y)^2} \quad (5)$$

[Math 6]

$$R21(p, m, x, y) = \sqrt{\sum_{a=1}^{PN} \sum_{X=x-nd1}^{x+nd1} \sum_{Y=y-nd2}^{y+nd2} Q11\{D(a, m, X, Y) - D(p, m, x, y)\} \times (Lumi(a, m, X, Y))^2} \quad (6)$$

[Math 7]

$$R22(p, m, x, y) = \sqrt{\sum_{a=1}^{1} \sum_{X=x-nd1}^{x+nd1} \sum_{Y=y-nd2}^{y+nd2} Q11\{D(a, m-1, X, Y) - D(p, m, x, y)\} \times (Lumi(a, m-1, X, Y))^2} \quad (7)$$

A third reliability degree R3(p, m, x, y) (0≤p<PN, 0≤x<HN, 0≤x<YN) indicated by Expression (8) is different from the second reliability degree R2(p, m, x, y) in that a luminance value Lumi (a, m−1, x, y) (a=1, 0≤x<HN, 0≤x<YN) of the peak "a" of the preceding frame f(m−1) is not used. The difference from Expression (5) is explained below. The third reliability degree R3(p, m, x, y) is calculated by, for example, multiplication of a square root of the first reliability degree R21(p, m, x, y) indicated by Expression (6) and a square root of a numerical value based on the numbers of couplings N1 and N2 indicated by Expression (9) and Expression (10).

[Math 8]

$$R3(p, m, x, y) = \sqrt{R21(p, m, x, y)} \times \sqrt{1 + \frac{N1}{N2}} \quad (8)$$

[Math 9]

$$N1 = \sum_{a=1}^{1} \sum_{X=x-nd1}^{x+nd1} \sum_{Y=y-nd2}^{y+nd2} Q11\{D(a, m-1, X, Y) - D(p, m, x, y)\} \quad (9)$$

[Math 10]

$$N2 = \sum_{a=1}^{PN} \sum_{X=x-nd1}^{x+nd1} \sum_{Y=y-nd2}^{y+nd2} Q11\{D(a, m, X, Y) - D(p, m, x, y)\} \quad (10)$$

N1 indicated by Expression (9) indicates the number of peaks in the preceding frame f(m−1) within an adjacent range having the distance value D(p, m, x, y) of the peak p and the distance value D(a, m−1, x, y) in the distance K. N2 indicated by Expression (10) indicates the number of peaks in the present frame f(m) within an adjacent range having the distance value D(p, m, x, y) of the peak p and the distance value D(a, m, x, y) in the distance K. As it is seen from this, a large number of peaks having equivalent distance values are present in an adjacent region with respect to the peak p. The second reliability degree R21(p, m, x, y) increases as a luminance value of the peaks increases. In this case, the reliability degree R3(p, m, x, y) further increases as the number of N1 increases.

The configuration according to this embodiment is as explained above. An operation example of the distance measuring device 5 according to this embodiment is explained below.

Figure 24:
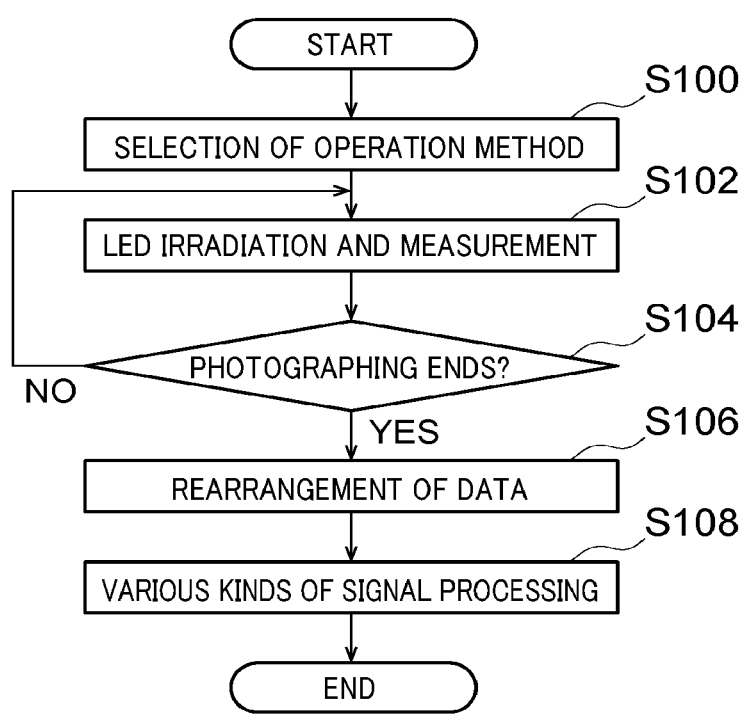
FIG. 24 depicts a flowchart for explaining a processing operation of a distance measuring device according to the embodiment.

FIG. 24 is a flowchart for explaining a processing operation of the distance measuring device 5 according to this embodiment. A photographing control example of a present frame is explained below.

The control circuit 16 (FIG. 2) selects an operation method including an irradiation method in the present frame (step S100). Subsequently, the signal processing circuit 22 (FIG. 2) sets a range of adjacent pixels according to pixels measured in advance.

Subsequently, the control circuit 16 switches the plurality of linear sensors 180a in order and switches an output of the switching circuit 190 according to the switching and performs measurement of time-series luminance signals of the pixels (step S102). Subsequently, averaging processing circuits of the signal processing circuit 22 performs, based on information concerning the set adjacent pixels, as parallel processing, integration processing for time-series luminance signals that can be subjected to the integration processing.

Subsequently, the control circuit 16 determines whether a set photographing operation for one frame has ended (step S104). When determining that the photographing operation has not ended (NO in step S104), the control circuit 16 repeats the processing from step S102. On the other hand, when determining that the photographing operation has ended (YES in step S104), the signal processing circuit 22 rearranges coordinates of various data in order of coordinates adjacent in a measurement space (step S106).

The signal processing circuit 22 preforms various kinds of processing such as moving averaging processing and distance measurement on the data, the coordinates of which are rearranged, (step S108) and ends the processing of the present frame.

As explained above, according to this embodiment, the switching circuit 190 switches and outputs output signals of the plurality of linear sensors 180a respectively having different light receiving positions with respect to the light-receiving optical system 204. The distance measurement circuit 300a measures a distance according to time-series luminance signals based on the output signals of the switching circuit 190. Consequently, the linear sensor 180a is capable of performing processing without being affected by noise of the other linear sensors 180a. It is possible to reduce the number of distance measurement circuits 300a.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device comprising:
a plurality of sensors configured to include a plurality of pixels that convert reflected light of laser light received via a light-receiving optical system which receives the reflected light of the laser light through a mirror rotating at a predetermined period with respect to a predetermined rotation axis, into multiple per-channel current signals, and to output the current signals of each of the plurality of pixels as output signals, light receiving positions of the plurality of sensors with respect to the light-receiving optical system being different from one another;
a setting circuit configured to set coordinates of pixels on the basis of timing information concerning irradiation timing of the laser light and rotation position information concerning a rotation position of the mirror;
a selecting circuit configured to select and output output signals used for measurement from the corresponding plurality of output signals for each of the plurality of sensors; and
a distance measurement circuit configured to measure distances to a measurement target object on the basis of time differences between light emission timing of the laser light and timing of a peak position of each of time-series luminance signals based on the output signals of the selecting circuit, wherein
the setting circuit gives identification information to coordinates not treated as adjacent pixels on the basis of the timing information concerning the irradiation timing of the laser light and the rotation position information concerning the rotation position of the mirror.

2. The distance measuring device according to claim 1, further comprising:

a storage circuit configured to store data based on the output signals output by the selecting circuit, wherein the mirror changes a direction by a driving force of MEMS, and the setting circuit is configured to set coordinates on the basis of timing information concerning irradiation timing of the laser light and rotation position information concerning a rotation position of the mirror.

3. The distance measuring device according to claim 2, wherein the distance measuring device irradiates the laser light via the mirror that performs forward rotation and backward rotation at a predetermined period with respect to the axis, and the setting circuit changes a setting method for the coordinates according to one-side irradiation for irradiating the laser light in only one of the forward rotation and the backward rotation and both-side irradiation for irradiating the laser light in both of the forward rotation and the backward rotation.

4. The distance measuring device according to claim 2, wherein the setting circuit gives the identification information to continuous coordinates, among the coordinates, of pixels that are non-adjacent to each other.

5. The distance measuring device according to claim 4, wherein the mirror is a polygon mirror including a plurality of mirror surfaces having different inclination angles and irradiates the laser light via the mirror surfaces, and the setting circuit gives the identification information when each of the continuous coordinates corresponds to the laser light irradiated by a different one of the mirror surfaces.

6. The distance measuring device according to claim 2, wherein the storage circuit stores distance values of a preceding frame for each of the coordinates obtained on the basis of the time-series luminance signals of the preceding frame, and the distance measurement circuit acquires a second distance value on the basis of peaks of a time-series luminance signal of a present frame, including a peak selected according to the distance values of the preceding frame in an adjacent region of the coordinates corresponding to the time-series luminance signals of a present frame.

7. The distance measuring device according to claim 6, wherein the adjacent region is set on the basis of the identification information.

8. The distance measuring device according to claim 2, wherein the selecting circuit selects the output signals according to the period.

9. The distance measuring device according to claim 1, wherein the selecting circuit selects the output signals according to irradiation timings of a plurality of light sources that respectively irradiate the laser light in different directions.

10. The distance measuring device according to claim 1, wherein the selecting circuit selects the output signals according to switching timing of mirror surfaces of a polygon mirror that respectively irradiate the laser light in different directions.

11. A distance measuring method for a distance measuring device including a plurality of sensors configured to include a plurality of pixels that convert reflected light of laser light received via a light-receiving optical system which receives the reflected light of the laser light through a mirror rotating at a predetermined period with respect to a predetermined rotation axis, into multiple per-channel current signals, and to output the current signals of each of the plurality of pixels as output signals, light receiving positions of the plurality of sensors with respect to the light-receiving optical system being different from one another, the distance measuring method comprising:

setting coordinates of pixels on the basis of timing information concerning irradiation timing of the laser light and rotation position information concerning a rotation position of the mirror;

selecting and outputting output signals used for measurement from the corresponding plurality of output signals for each of the plurality of sensors; and measuring distances to a measurement target object on the basis of time differences between light emission timing of the laser light and timing of a peak position of each of time-series luminance signals based on the output signals that is selected and output, wherein in the setting the coordinates, identification information is given to coordinates not treated as adjacent pixels on the basis of the timing information concerning the irradiation timing of the laser light and the rotation position information concerning the rotation position of the mirror.

12. The distance measuring method according to claim 11, further comprising:

storing data based on the output signals that are selected and output in the coordinates;

changing a direction of reflection of a mirror by a driving force of MEMS; and setting coordinates on the basis of timing information concerning irradiation timing of the laser light and rotation position information concerning a rotation position of the mirror.

13. The distance measuring method according to claim 12, wherein the laser light is irradiated via the mirror that performs forward rotation and backward rotation at a predetermined period with respect to the axis, and in the setting the coordinates, a setting method for the coordinates is changed according to one-side irradiation for irradiating the laser light in only one of the forward rotation and the backward rotation and both-side irradiation for irradiating the laser light in both of the forward rotation and the backward rotation.

14. The distance measuring method according to claim 12, wherein, in the setting the coordinates, the identification information is given to continuous coordinates, among the coordinates, of pixels that are non-adjacent to each other.

15. The distance measuring method according to claim 14, wherein the mirror is a polygon mirror including a plurality of mirror surfaces having different inclination angles and irradiates the laser light via the mirror surfaces, and in the setting the coordinate, the identification information is given when each of the continuous coordinates corresponds to the laser light irradiated by a different one of the mirror surfaces.

16. The distance measuring method according to claim 12, wherein in the storing the data, distance values of a preceding frame for each of the coordinates obtained on the basis of time-series luminance signals of the preceding frame is stored, and in the measuring the distance to the measurement target object, a second distance value is acquired on the basis of peaks of a time-series luminance signal of a present frame, including a peak selected according to the distance values of the preceding frame in an adjacent region of the coordinates corresponding to the time-series luminance signals of a present frame.

* * * * *